(12) United States Patent
Sanders et al.

(10) Patent No.: US 11,578,670 B2
(45) Date of Patent: Feb. 14, 2023

(54) MASS-FLOW THROTTLE FOR LARGE NATURAL GAS ENGINES

(71) Applicants: EControls, LLC, San Antonio, TX (US); Justin H Sanders, San Antonio, TX (US); Kennon Guglielmo, San Antonio, TX (US); Michael T. Hambidge, San Antonio, TX (US); Timothy J. Westerdale, San Antonio, TX (US)

(72) Inventors: Justin H Sanders, San Antonio, TX (US); Kennon Guglielmo, San Antonio, TX (US); Michael T. Hambidge, San Antonio, TX (US); Timothy J. Westerdale, San Antonio, TX (US)

(73) Assignee: EControls, LLC, San Antonio, TX (US)

( * ) Notice: Subject to any disclaimer, the term of this patent is extended or adjusted under 35 U.S.C. 154(b) by 120 days.

(21) Appl. No.: 16/975,235

(22) PCT Filed: Feb. 28, 2019

(86) PCT No.: PCT/US2019/020160
§ 371 (c)(1),
(2) Date: Aug. 24, 2020

(87) PCT Pub. No.: WO2019/169201
PCT Pub. Date: Sep. 6, 2019

(65) Prior Publication Data
US 2020/0408155 A1    Dec. 31, 2020

Related U.S. Application Data

(60) Provisional application No. 62/636,382, filed on Feb. 28, 2018.

(51) Int. Cl.
*F02D 9/10*     (2006.01)
*F02D 41/00*    (2006.01)
*F02D 41/20*    (2006.01)

(52) U.S. Cl.
CPC ............ *F02D 9/105* (2013.01); *F02D 9/107* (2013.01); *F02D 41/0002* (2013.01); *F02D 41/20* (2013.01); *F02D 41/0027* (2013.01)

(58) Field of Classification Search
CPC .......... F02D 9/105; F02D 9/107; F02D 41/00; F02D 41/0002; F02D 41/0027; F02D 41/20
See application file for complete search history.

(56) References Cited

U.S. PATENT DOCUMENTS 2,475,086 A  7/1949 Ensign
4,524,745 A  6/1985 Tominari et al.
(Continued)

FOREIGN PATENT DOCUMENTS

CN    101535620 B    12/2012
CN    102192023 B    9/2014
(Continued)

OTHER PUBLICATIONS

Bosch Engineering GmbH, "Bosch Motorsport, Electronic Throttle Body" specification sheet 510487 15, pp. 1-3, en, V, 20, Jul. 2020.

*Primary Examiner* — John Kwon
*Assistant Examiner* — Johnny H Hoang
(74) *Attorney, Agent, or Firm* — William H. Quirk; Alexander J. Antonio; Rosenthal Pauerstein Sandoloski Agather, LLP

(57) ABSTRACT

A mass-flow throttle for highly accurate control of the gaseous supplies (fuel and/or air) to the combustion chambers for a large engine in response to instantaneous demand signals from the engine's ECM, especially for large (i.e., 30

(Continued)

liters or greater in size) spark-ignited internal combustion engines fueled by natural gas. With a unitary block assembly and a throttle blade driven by a non-articulated rotary actuator shaft, in combination with tight control circuitry including multiple pressure sensors as well as sensors for temperature and throttle position, the same basic throttle concepts are innovatively suited to be used for both MFG and MFA throttles in industrial applications, to achieve highly accurate mass-flow control even despite pressure fluctuations while operating in non-choked flow.

12 Claims, 12 Drawing Sheets

(56) References Cited

U.S. PATENT DOCUMENTS

| | | | |
|---|---|---|---|
| 5,720,258 | A | 2/1998 | Tolkacz et al. |
| 5,755,254 | A | 5/1998 | Carter et al. |
| 5,868,159 | A | 2/1999 | Loan et al. |
| 5,873,351 | A | 2/1999 | Vars et al. |
| 6,016,832 | A | 1/2000 | Vars et al. |
| 7,032,569 | B2 | 4/2006 | Ikeda et al. |
| 9,957,920 | B2 | 5/2018 | Walser et al. |
| 10,316,797 | B2 | 6/2019 | Walser et al. |
| 2001/0032628 | A1 | 10/2001 | Goto et al. |
| 2002/0083980 | A1 | 7/2002 | Nakajima et al. |
| 2004/0231644 | A1 | 11/2004 | Ikeda et al. |
| 2005/0284451 | A1 | 12/2005 | Uhde et al. |
| 2009/0088950 | A1 | 4/2009 | Fisher et al. |
| 2009/0183716 | A1 | 7/2009 | Kojima et al. |
| 2010/0089364 | A1 | 4/2010 | Flanagan et al. |
| 2011/0186013 | A1 | 8/2011 | Sasaki |
| 2012/0046886 | A1 | 2/2012 | Bowling et al. |
| 2012/0111307 | A1 | 5/2012 | Hagen |
| 2013/0255638 | A1 | 10/2013 | Takagi et al. |
| 2013/0333671 | A1* | 12/2013 | Walser ............... F02M 21/0233 123/480 |
| 2014/0305406 | A1 | 10/2014 | Pursifull |
| 2015/0096533 | A1 | 4/2015 | Hiramoto et al. |
| 2016/0265469 | A1* | 9/2016 | Harada ............... F02M 51/061 |
| 2019/0293027 | A1 | 9/2019 | Walser et al. |

FOREIGN PATENT DOCUMENTS

| | | |
|---|---|---|
| CN | 104514639 A | 4/2015 |
| CN | 104847508 A | 8/2015 |
| DE | 4140353 | 6/1992 |
| DE | 10346983 | 5/2005 |
| DE | 102008034581 A1 | 1/2009 |
| EP | 2208875 | 7/2010 |
| GB | 2252641 A | 8/1992 |
| WO | 2012053192 A1 | 4/2012 |
| WO | 2013192331 A1 | 7/2014 |
| WO | 2017164801 | 9/2017 |
| WO | 2018022746 | 2/2018 |

* cited by examiner

MASS-FLOW THROTTLE FOR LARGE NATURAL GAS ENGINES

CLAIM OF PRIORITY TO PRIOR APPLICATION

This application claims the benefit of the filing date of U.S. Provisional Application Ser. No. 62/812,253, filed on Feb. 28, 2019, entitled "Mass-Flow Throttle for Large Natural Gas Engines," the entire disclosure of which is hereby incorporated by reference in its entirety.

FIELD OF THE INVENTION

The present invention primarily relates to a throttle for large natural gas engines. Particularly, it pertains to a throttle for controlling the mass flow rate to the combustion chambers for large gaseous fuel spark-ignited internal combustion engines, particularly for stationary industrial applications, and more particularly while operating in low pressure non-choked flow.

BACKGROUND

Throttle valves have long been used in large natural gas engines, but existing control strategies tend to be lacking. More accurate flow control is needed in order to obtain optimally efficient fuel combustion based on the demands of an Engine Control Module (ECM). Precisely controlled mass flowrates are difficult to achieve, especially with non-choked flow. Electronic throttles are commonly used in large engines to control the mass flow rates of fuel and air. ECM advancements have vastly improved the ability to optimize efficiency and performance and minimize emission concerns with spark-ignited internal combustion engines. By continuously monitoring numerous sensors and inputs, ECM's can balance the current operator commands against performance conditions to determine the most ideal supply flowrates needed for the engine at any given instant.

Knowing the ideal flowrate and delivering it, however, are two very different things. Even though modern ECMs can know the ideal at any given instant, practical prior art fuel supplies are not able to consistently deliver it instantaneously on demand across their entire range of operation. The very best of available controls claim to provide 1% setpoint accuracy, which means they claim to deliver an actual supply flowrate within about 1% of the demanded flowrate. The ability to consistently deliver a gaseous supply flowrate with 1% setpoint accuracy is considered extremely accurate and would be ideal, but claims to that effect tend to only be part of the story.

With the prior art, extreme setpoint accuracies tend to only be attained within a limited range of operation, which means that claimed accuracies are generally unreliable, especially for engines having large dynamic power ranges. (An engine's "dynamic power range" is the ratio of maximum power to minimum power over which the engine will operate as specified, which is dependent largely on the effective turndown ratio of the associated fuel supply system.) For a fuel supply delivering 25 grams/second at the top end of its operating range, for instance, one percent would be a quarter-gram/second (0.25 g/s). While calibrating one of the best available valves to a quarter-gram/second error can be manageable for moderate flowrates, the same fuel supply often needs to also idle at about a quarter-gram/second at the opposite end of its operating range, such that the same quarter-gram/second error would be tremendously inaccurate for near-idle flowrates. Although accurate control is sometimes considered easier to achieve with lower flowrates, setpoint accuracy at a quarter-gram/second idle flowrate would require accuracy to within ±0.0025 g/s. So, while prior art gas flow throttles claim to deliver extremely accurate flowrates at specified portions of their overall operating range, it has long been unattainable to achieve as much for both ends of the operating range and everything in between, especially for such large ranges in real-world operation.

The complex interaction of too many real-world variables frustrates the pursuit of consistently high, full-range setpoint accuracies for gaseous supply mass flowrates. Wear and tear, leaks, lag times, glitches, clogs, noise, artifacts, and general variability all tend to happen in the real world. External temperatures and wide variability in gaseous fuel and air compositions further compound the challenges.

Moreover, even if perfection was achievable within a gaseous supply's flowrate control itself, flowrate accuracies can be thwarted by upstream and downstream pressure fluctuations as well, especially when the flow through the throttle is not choked. Because gaseous fluids are compressible, downstream events related to combustion or valve and piston movements can cause pressure waves that create sizable flowrate fluctuations. Upstream pressure fluctuations can be equally problematic, especially when controlling the flowrate of vaporized liquid fuels (e.g., LNG or LPG) or of boosted or turbocharged systems.

Thus, there has long been a need for a throttle that can accurately and consistently deliver ECM-demanded mass flow rates in the field of gaseous supply systems for large spark-ignited engines, even while controlling non-choked flows, which are common with low-pressure supply flows but which also occur in many high pressure scenarios as well. For more background in light of choked mass flow control, refer to U.S. Pat. No. 9,957,920, a copy of which is incorporated herein by reference in its entirety.

SUMMARY OF THE INVENTION

It will become evident to those skilled in the art that thoughtful use of the invention and embodiments disclosed herein will resolve the above-referenced and many other unmet difficulties, problems, obstacles, limitations, and challenges, particularly when contemplated in light of the further descriptions below considered in the context of a comprehensive understanding of the prior art.

The present invention accomplishes as much by enabling fast-acting, highly accurate gaseous supply flowrate control for large spark-ignited internal combustion engines, which is particularly beneficial for engines that use natural gas as a fuel source. The gaseous fuel is preferably derived from either a liquefied natural gas (LNG) or compressed natural gas (CNG) storage state. A large engine is defined here as any engine that is 30 liters or greater. The engine is preferably used in stationary applications such as generator sets (hereinafter "gensets"). Alternatively, the engine may be used in large mobile applications such as mining trucks, ships, trains or other heavy-duty vehicles. Although preferred embodiments typically operate to control non-choked flow, often in low pressure applications, they nonetheless achieve highly accurate mass flow control. Our objectives include enabling such flow control in response to instantaneous demand signals from the engine's ECM while consistently maintaining extreme accuracy over large dynamic power ranges, despite most upstream, downstream and even midstream pressure fluctuations.

Possible embodiments can manifest in numerous different combinations and in numerous different kinds of improved machines, internal combustion engines, gaseous supply control systems, and the like. Other possible embodiments are manifest in methods for operating and optimizing such machines, engines, systems and the like, as well as in other types of methods. All of the various multifaceted aspects of the invention and all of the various combinations, substitutions and modifications of those aspects might each individually be contemplated as an invention if considered in the right light.

The resulting combinations of the present invention are not only more versatile and reliable, but they are also able to achieve greater accuracy despite rapidly changing conditions over a larger dynamic power range than has ever been achieved with such a simple system. The various embodiments improve on the related art, including by optimizing reliability, manufacturability, cost, efficiency, ease of use, ease of repair, ease of adaptability, and the like. Although the embodiments referenced below do not provide anything remotely near an exhaustive list, this specification describes select embodiments that are thought to achieve many of the basic elements of the invention.

In accord with many of the teachings of the present invention, a throttle is provided in a form that is readily adaptable to the power demands of numerous applications and is readily capable of achieving highly accurate setpoint accuracy for controlling gaseous supply flowrates across very large dynamic power ranges in internal combustion engines. Such flowrate control throttles and related fuel systems materially depart from the conventional concepts and designs of the prior art, and in so doing provide many advantages and novel features which are not anticipated, rendered obvious, suggested, or even implied by any of the prior art, either alone or in any obvious combination thereof.

Through its innovative combination of features and elements, a throttle according to the teachings of the invention is able to consistently and reliably achieve highly accurate mass flow control for various large engine applications, even with non-choked flow. Some of the features and elements that enable that result include the use a unitary block assembly for the throttle, and a fast-acting actuator, plus a single unitary and rigid rotary shaft for driving a throttle blade, supported by three different bearing assemblies along the length of the shaft, as well as a commonly-contained assembly of the control circuitry together with the rotary actuator as well as the throttle itself, all of which help minimize slop in the control. In addition, the invention is preferably embodied with multiple pressure sensors that are at least partially redundant, which enables the controller to self-check the various sensors in real time.

To be all encompassing, many other aspects, objects, features and advantages of the present invention will be evident to those of skill in the art from a thoughtful and comprehensive review of the following descriptions and accompanying drawings in light of the prior art, all to the extent patentable. It is therefore intended that such aspects, objects, features, and advantages are also within the scope and spirit of the present invention. It should be understood, however, that the detailed description and the specific examples, while indicating preferred embodiments of the invention, are given by way of illustration only, since various expansions, changes and modifications within the spirit and scope of the invention will become apparent to those skilled in the art from this detailed description.

Indeed, the present invention will ultimately be defined relative to one or more patent claims or groups of claims that may be appended to this specification or to specifications that claim priority to this specification, as those claims may be amended, divided, refined, revamped, replaced, supplemented or the like over time. Even though the corresponding scope of the invention depends on those claims, these descriptions will occasionally make references to the "invention" or the "present invention" as a matter of convenience, as though that particular scope is already fully understood at the time of this writing. Indeed, multiple independent and distinct inventions may properly be claimed based on this specification, such that reference to the "invention" is a floating reference to whatever is defined by the ultimate form of the corresponding patent claims. Accordingly, to the extent these descriptions refer to aspects of the invention that are not separately required by the ultimate patent claims, such references should not be viewed as limiting or as describing that variation of the invention.

The invention, accordingly, is not limited in its application to the details of construction and to the arrangements of the components set forth in the following descriptions or illustrated in the drawings. Instead, the drawings are illustrative only, and changes may be made in any specifics illustrated or described, especially any referenced as "preferred." Such changes can be implemented while still being within the spirit of the invention. Also, it is to be understood that the phraseology and terminology employed herein are for the purpose of the description and should not be regarded as limiting. Other terminology and language that describes the invention and embodiments and their function will be considered as within the spirit of the invention.

The invention is capable of many other embodiments and of being practiced and carried out in numerous other ways. It should also be understood that many other alternative embodiments are not shown or referenced that would still be encompassed within the spirit of the invention, which will be limited only by the scope of claims that may be original, added, or amended in this or any other patent application that may in the future claim priority to this application.

BRIEF DESCRIPTIONS OF THE DRAWINGS

Various features and advantages of the invention will now be described with reference to the drawings of certain preferred and alternative embodiments, which are intended to illustrate and not to limit the invention, where reference numbers may refer to like elements.

Figure 10:
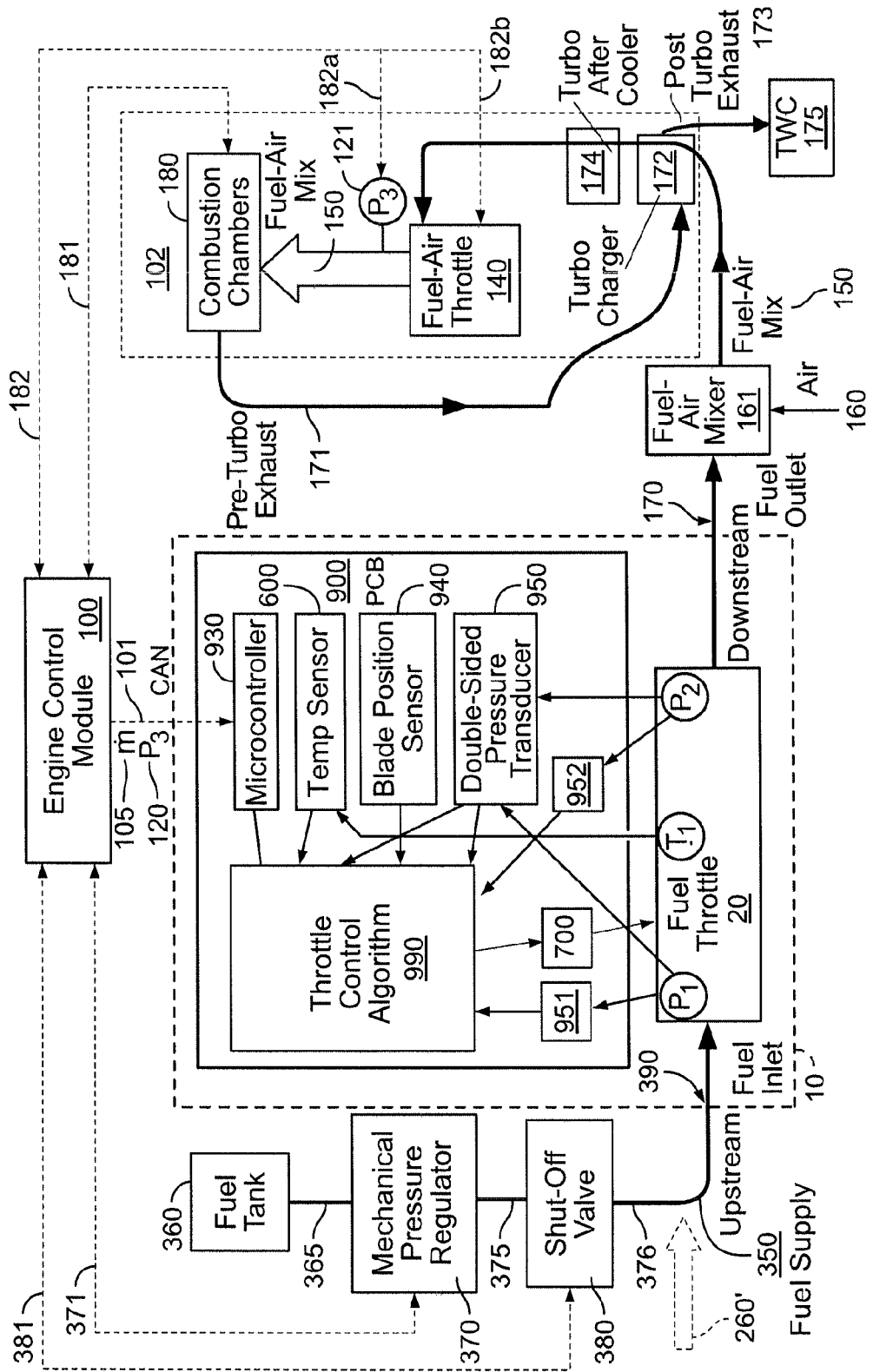

FIG. 10 is a block diagram illustrating a preferred embodiment of a gaseous fuel supply system with a large engine MFG throttle 20, operatively integrated with an internal combustion engine 102 to provide highly accurate control of the gaseous fuel supply to that engine 102 in accordance with various teachings of the present invention.

DETAILED DESCRIPTIONS OF ILLUSTRATED EMBODIMENTS

The following examples are described to illustrate preferred embodiments for carrying out the invention in practice, as well as certain preferred alternative embodiments to the extent they seem particularly illuminating at the time of this writing. In the course of understanding these various descriptions of preferred and alternative embodiments, those of skill in the art will be able to gain a greater understanding of not only the invention but also some of the various ways to make and use the invention and embodiments thereof.

Wording Conventions

For purposes of these descriptions, a few wording simplifications should be understood as universal, except to the extent otherwise clarified in a particular context either in the specification or in any claims. For purposes of understanding descriptions that may be basic to the invention, the use of the term "or" should be presumed to mean "and/or" unless explicitly indicated to refer to alternatives only, or unless the alternatives are inherently mutually exclusive. When referencing values, the term "about" may be used to indicate an approximate value, generally one that includes a standard deviation of error for any particular embodiments that are disclosed or that are commonly used for determining or achieving such value. Reference to one element, often introduced with an article like "a" or "an", may mean one or more, unless clearly indicated otherwise. Such "one or more" meanings are most especially intended when references are made in conjunction with open-ended words such as "having," "comprising" or "including." Likewise, "another" may mean at least a second or more. Other words or phrases may have defined meanings either here or in the accompanying background or summary descriptions, and those defined meanings should be presumed to apply unless the context suggests otherwise.

These descriptions occasionally point out and provide perspective as to various possible alternatives to reinforce that the invention is not constrained to any particular embodiments, although described alternatives are still just select examples and are not meant to represent an exhaustive identification of possible alternatives that may be known at the time of this writing. The descriptions may occasionally even rank the level of preference for certain alternatives as "most" or "more" preferred, or the like, although such ranked perspectives should be given little importance unless the invention as ultimately claimed irrefutably requires as much. Indeed, in the context of the overall invention, neither the preferred embodiments nor any of the referenced alternatives should be viewed as limiting unless our ultimate patent claims irrefutably require corresponding limits without any possibility for further equivalents, recognizing that many of the particular elements of those ultimate patent claims may not be required for infringement under the U.S. Doctrine of Equivalents or other comparable legal principles. Having said that, even though the invention should be presumed to cover all possible equivalents to the claimed subject matter, it should nonetheless also be recognized that one or more particular claims may not cover all described alternatives, as would be indicated either by express disclaimer during prosecution or by limits required in order to preserve validity of the particular claims in light of the prior art.

As of the date of writing, the structural and functional combinations characterized by these examples are thought to represent valid preferred modes of practicing the invention. However, in light of the present disclosure, those of skill in the art should be able to fill-in, correct or otherwise understand any gaps, misstatements or simplifications in these descriptions.

For descriptive reference, we categorize supply flowrate setpoint accuracy as being "generally accurate" if it is consistently within 5% of the demanded flowrate across its entire operating range. When consistently within 3% of the demanded flowrate across the entire range, setpoint accuracy can be categorized as "highly accurate." At the extreme, when setpoint accuracy is consistently within about 1% of the demanded flowrate across the entire operating range, it can be classified as "extremely accurate."

It is also notable that, while many embodiments may be used for mass flow control of either air or fuel, or combinations of air and fuel, these descriptions will commonly refer to control of a "supply flow", which should generally be understood to refer to control of any such supply flow, whether it be air, fuel, or a combination. It will be understood, nonetheless, that a throttle according to these descriptions that is intended strictly for controlling the fuel supply flow will be plumbed at a different location than one that is plumbed for just controlling air. Likewise, a throttle according to these descriptions that is deployed for controlling mass flow of air without fuel will be plumbed at a different location than one that is plumbed for controlling the mixture of fuel and air. We presently prefer to include one throttle for controlling just the gaseous fuel supply flow, to achieve highly accurate control of the mass flow of the fuel (sometimes referred to as mass-flow-gas, or "MFG"), together with another throttle further downstream for controlling the supply flow after air has been mixed with the supply flow of fuel (which is sometimes referred to as mass-flow-air, or "MFA", irrespective of the inclusion of the fuel in the same flow). Nonetheless, complete and highly accurate mass flow control can also be achieved by combining an MFG throttle together with an MFA throttle that is plumbed in the air supply upstream of the fuel-air mixer. Moreover, generally accurate overall control might also be attainable by just controlling the mass flow of the fuel, without actively controlling the mass flow of the air if other reliable data is used to calculate that mass flow of the air, such as through use of oxygen sensors in combination with pressure, temperature and the like. Whatever the choice for a specific application, we trust that those of skill in the art will understand where and how to include such throttles for the different purposes to achieve the different combinations for overall mass flow control.

With respect to any valve, throttle or actuator, "fast-acting" is a term that is generally understood by those of skill in the art, and the term should be presumed to generally mean that it is designed to act or respond considerably faster or quicker than most throttles, valves or actuators. More limited definition may be applied to the phrase to the extent expressly disclaimed during prosecution or to the extent necessary for preserving validity of particular claims in light of the prior art. Despite the presumed broader meaning, fast-acting actuators referenced in these descriptions are preferably operable to move the actuated throttle element through most of its entire operable range of motion (preferably from 20% to 80% of that operable range), if not all of that operable range, in fifty milliseconds or less, although many other types of actuators are still likely to be suitable as alternatives, especially to the extent particular claim elements are not expressly disclaimed to require particular fast-acting characteristics.

The term "large engine throttle" 10 is used herein to describe the mass-flow throttle of numerous preferred embodiments and it refers to the throttle and throttle control system rather than merely the throttle body 20 or the butterfly valve (or throttle blade) 210 therein. Despite the "large engine" descriptor for throttle 10, the reader should understand that various aspects of such large engine throttle may be beneficial for smaller engines as well, such that the reference to "large engine" should not be considered as limiting unless estoppel, validity in view of the prior art, or other legal principles clearly require an interpretation that is limited to large engines. The simpler term "throttle" 20 is used herein interchangeably with the term "throttle body assembly" 20. With respect to fuels, the term "fluid" is used herein to mean either a liquid or a gas, although liquid fuel embodiments are preferably adapted to vaporize the liquid phase of the fuel before the flow reaches the large engine throttle 10. In the context of a supply flowrate control, a "continuous fluid passage" refers to a fluid passageway of any sort, whether defined through tubes, channels, chambers, baffles, manifolds or any other fluid passageway that is uninterrupted by fully closed valves, pistons, positive displacement pumps or the like during its normal operative mode of controlling the fuel flowrate, such that gaseous fluid is generally able to continually flow through a continuous fluid passage whenever a pressure gradient is present to cause such flow. It should be recognized, though, that a continuous fluid passage in this context can be regulated to zero flowrate by reducing the effective area of an opening to zero, while the passage would still be considered as a continuous fluid passage in this context. In addition, absent clear disclaimer otherwise, equivalent structures can be fully closed when not operating to control the flowrate, and equivalent structures may also have parallel or alternate passageways where one or more may be interrupted without discontinuing the overall flow.

Exploded and Unexploded Views of Large Engine Throttle 10

Figure 1A:
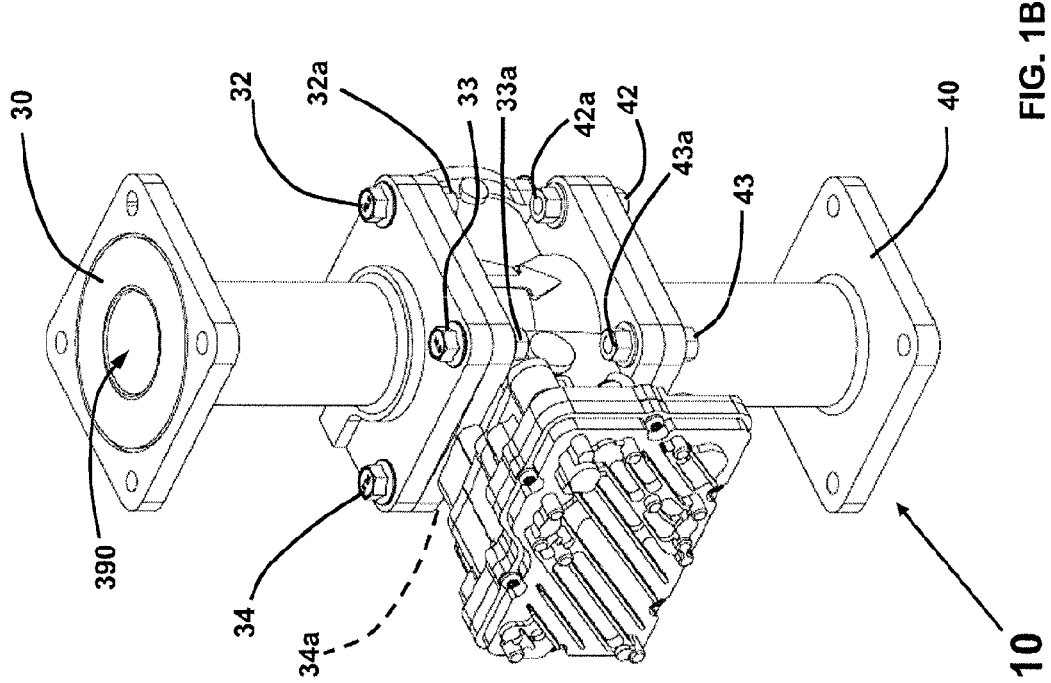
FIG. 1A and FIG. 1B are perspective views of the preferred mass flow throttle 10.
Figure 1B:
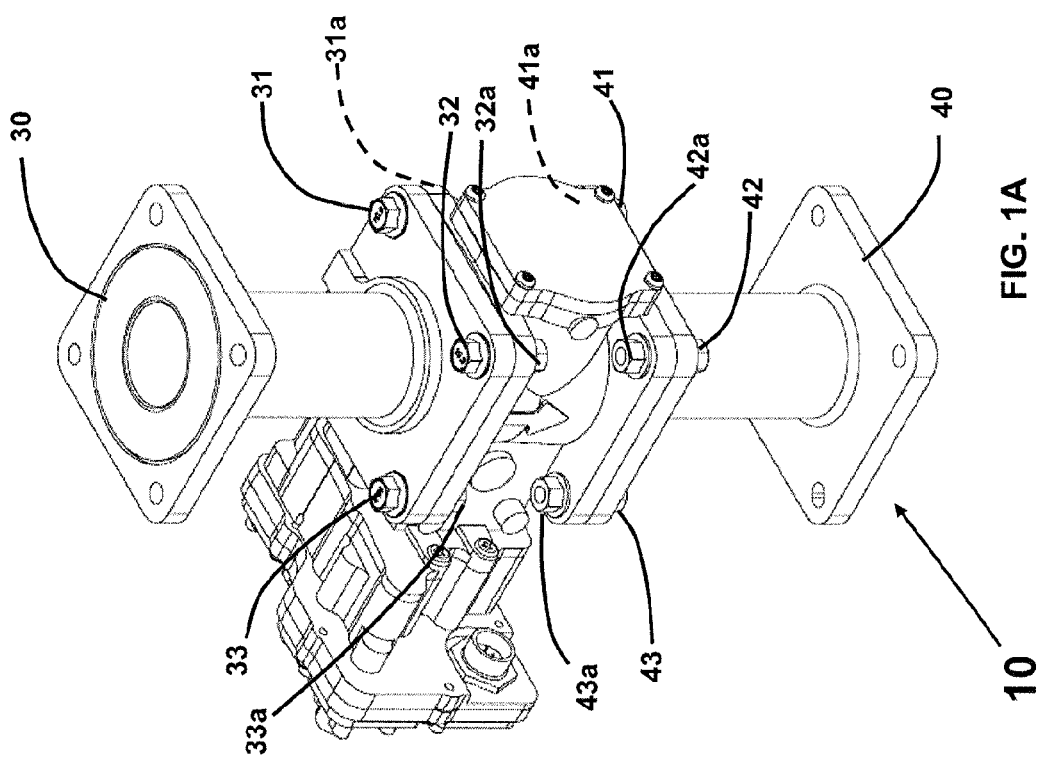

Turning to FIGS. 1A and 1B, there are shown perspective views of the preferred large engine throttle 10. As shown therein, large engine throttle 10 includes an inlet adapter 30 and an outlet adapter 40. Inlet adapter 30, in part, defines supply inlet 390, which is configured to allow supply flow into large engine throttle 10. Outlet adapter 40, in part, defines supply outlet 170 (shown in FIGS. 2B and 10), which is configured to allow supply flow out of large engine throttle 10. Screws 31-34 are paired with machine nuts 31a-34a for securing inlet adapter 30 to housing assembly 20 (shown in more detail in FIGS. 2A-4). Similarly, screws 41-44 are paired with machine nuts 41a-44a for securing outlet adapter 40 to housing assembly 20. Detailed descriptions of assemblies and components of the preferred embodiment are provided in ensuing paragraphs.

Figure 2B:
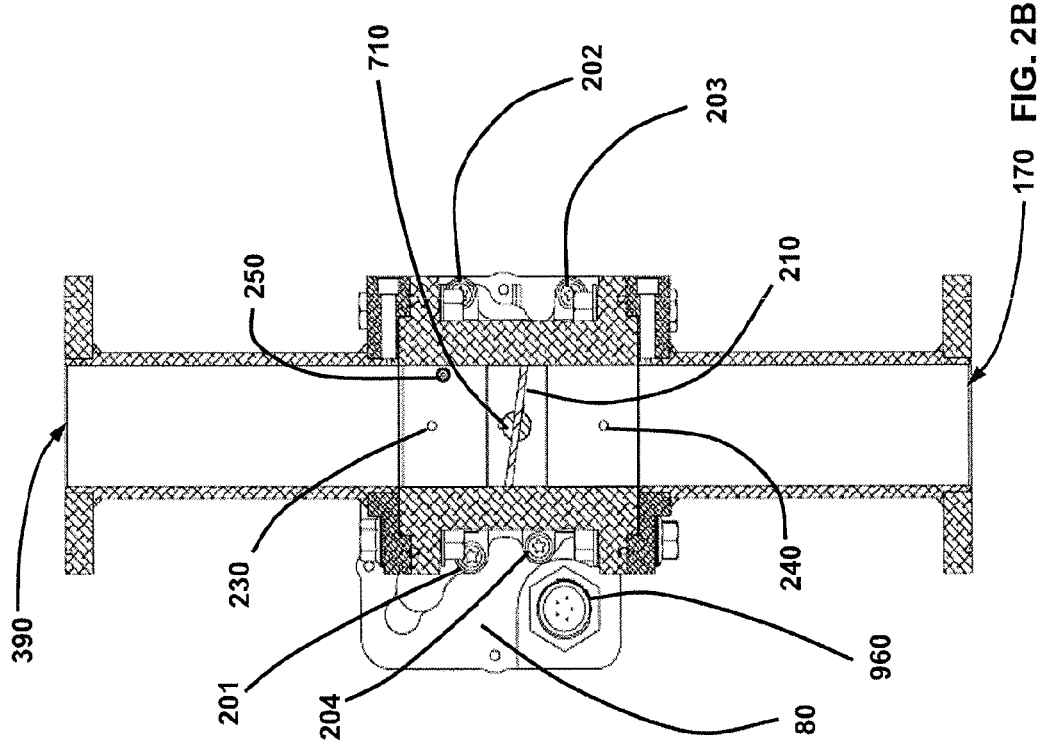
FIG. 2B is a sectional view of the preferred large engine throttle 10 of FIG. 2A, centrally sectioned through sectional plane B-B of FIG. 2A.
Figure 2A:
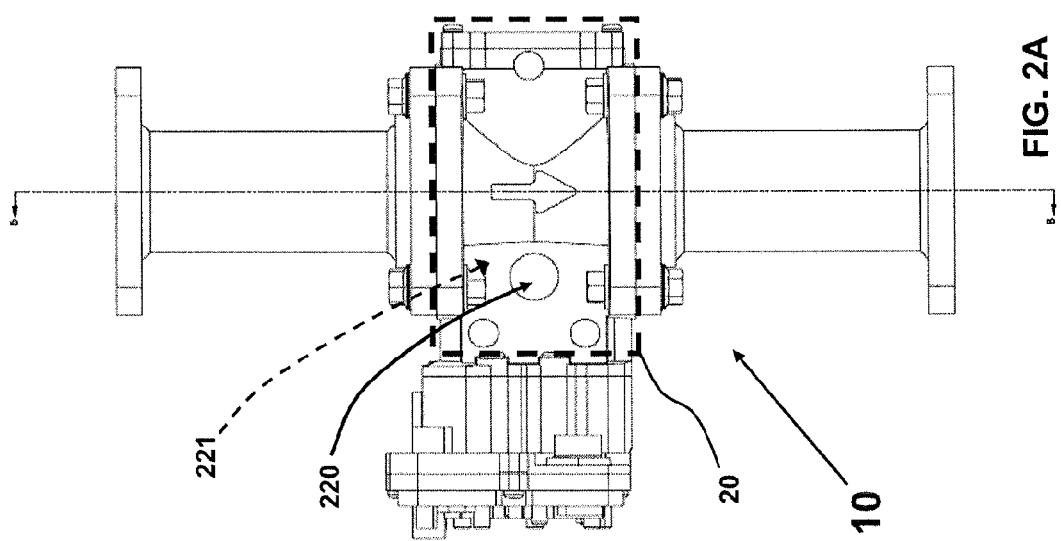
FIG. 2A is a front view of the preferred large engine throttle 10.

With reference to FIG. 2A, there is shown a two-dimensional view of the large engine throttle 10. A coolant port 220 can be seen in the front of housing assembly 20 (shown in dashed-line box) and another coolant port 221 (not shown) is located on the opposite side. Especially when throttle 10 is used as an air-fuel (MFA) throttle, hot gasses may flow through throttle 10. To cope with the temperature of such hot gasses, and particularly to guard against thermal damage to the control circuitry associated with PCB 900 or to the motor 700, a heat dissipator (not numbered) is located within the unitary block assembly 99 between main throttle body 20 and motor 700 as well as PCB 900. The heat dissipater preferably is in the form of an aluminum component enclosing one or more flow-through passageways with relatively large surface areas for enabling liquid coolant to circulate therethrough and thereby cool the aluminum component. As will be understood by those of skill in the art, heat dissipators are commonly used on turbocharged applications like the large engine throttle 10. The coolant ports 220 and 221 enable coolant to enter and flow around the large engine throttle 10 to keep the brushless motor 700 (shown in FIG. 7) and main PCB 900 (shown in FIG. 9) from overheating.

With reference to FIG. 2B, there is shown a cross-section, indicated by line B-B, of the embodiment illustrated in FIG. 2A rotated clockwise 90 degrees. The throttle shaft 710 (sometimes referred to as an actuator "drive shaft") controls movement of the throttle blade 210, with minimal opportunity for slop or other errors. The upstream pressure $P_1$ (upstream of throttle blade 210) is measured at port 230 by pressure sensor 951 on PCB 900, as the stovepipe of sensor 951 is connected in open fluid communication with port 230, through an open passage (not shown) that runs through the unitary block assembly and a tube between port 230 and the stovepipe of sensor 951. Likewise, the downstream pressure $P_2$ (downstream of throttle blade 210) is measured at port 240 by pressure sensor 952 on PCB 900, as the stovepipe of sensor 952 is connected in open fluid communication with port 240, through an open passage (not shown) that runs through the unitary block assembly and a tube between port 240 and the stovepipe of sensor 952.

Each of ports 230 and 240 have fluid passage segments in close proximity to the ports that are oriented perpendicular to the flowline of the throttle fluid passage of throttle 10, to minimize stagnation or suction pressures due to their orientation relative to flow. However, the next adjacent segments of each are oriented to slope slightly upwardly relative to gravity in order to minimize the risk of clogging. The temperature of the fluid is measured at port 250 using a thermistor 600 (shown in FIG. 6). Screws 201-204 unite throttle body assembly 20 with intermediate housing assembly 80.

Figure 3:
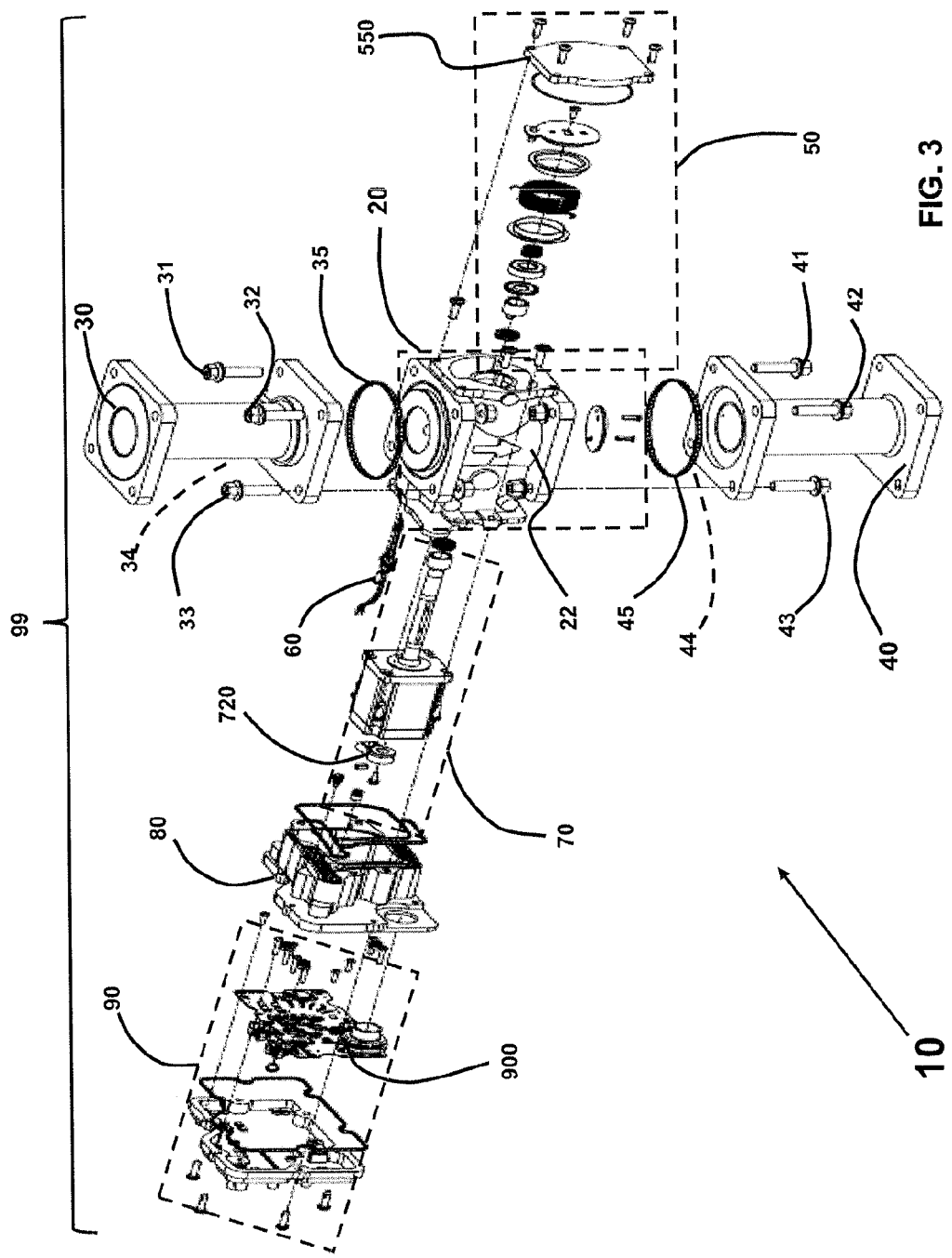
FIG. 3 is an exploded perspective view of the preferred large engine throttle 10.
Figure 3A:
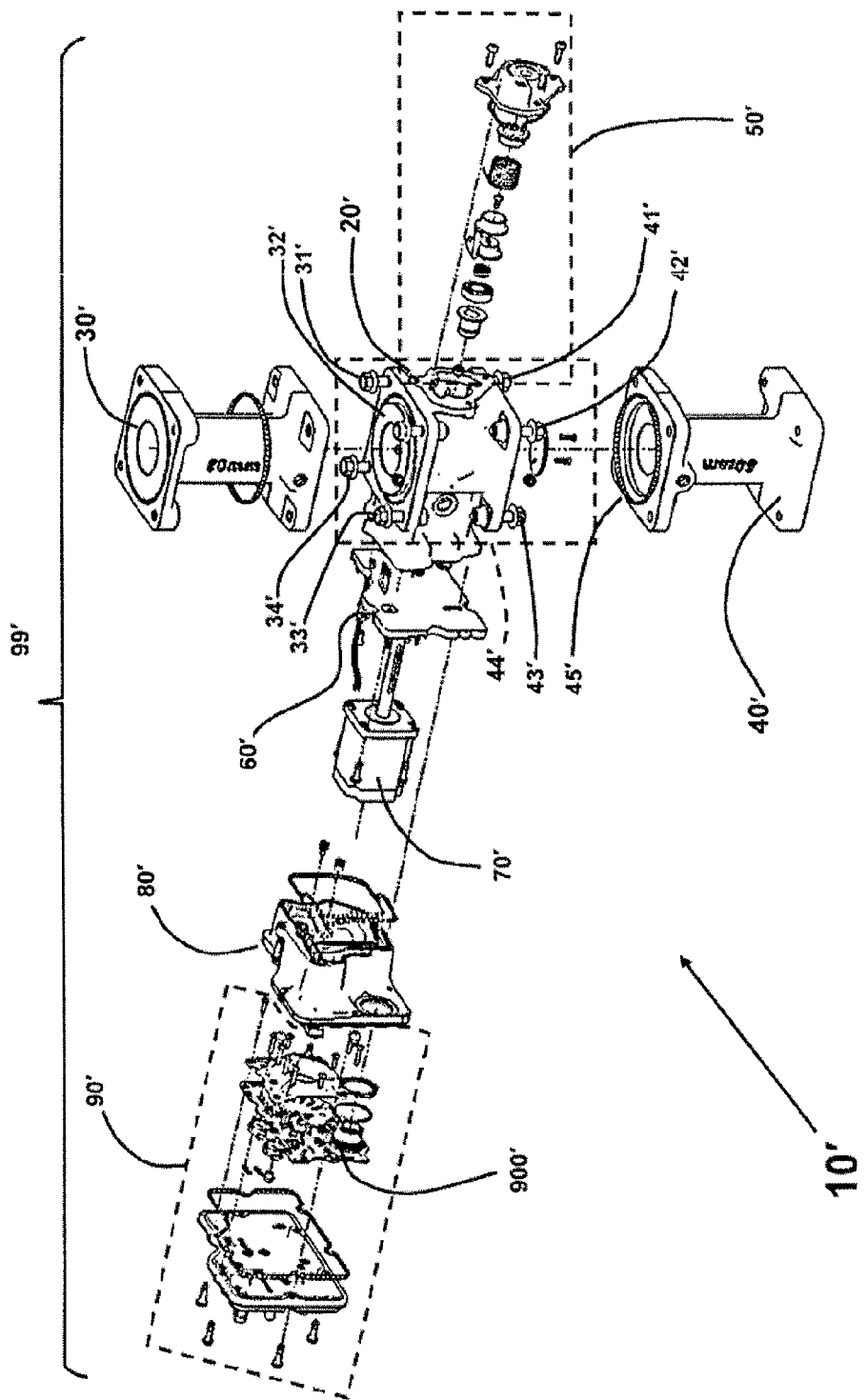
FIG. 3A is an exploded perspective view of large engine throttle 10', which is an alternative embodiment of the throttle 10 of FIG. 3.

With reference to FIG. 3, dashed-line boxes are used to depict some of various assemblies of and within an embodiment of the unitary block assembly 99 of throttle 10. Assemblies that rigidly unite to form the unitary block assembly 99 include the walls 22 of central throttle body 20, the spring return cover 550 of spring return assembly 50 at the end toward the right in FIG. 3, control circuitry cover 901 at the other end toward the left in FIG. 3, with the intermediate housing 800 of motor enclosure 80 positioned between throttle body 20 and the PCB space. In addition, as will be understood, numerous screws are used to rigidly unite the sub-blocks of the embodiment of FIG. 3 together, preferably with inset seals to ensure a sealed union between each of the various subblocks. Two additional subblocks— namely the inlet extension and the flow outlet extension are also united to the unitary block assembly 99 of FIG. 3. Analogously, the unitary block assembly 99' of the embodiment shown if FIG. 3A is also very similar to assembly 99 of FIG. 3.

More particularly, the unitary block assembly is composed of various sub-blocks and covers that are preferably all of predominantly aluminum composition in the preferred embodiment. The resulting unitary block assembly of throttle 10 defines the inner and outer surfaces of throttle 10. That unitary block assembly is illustrated as a billet type assembly of aluminum parts evident in the various views of FIGS. 1-4, although it should be understood that preferred embodiments may also be formed through larger castings having fewer sub-blocks in order to reduce costs for volume production. These assemblies are illustrated in greater detail in the figures that follow. In FIG. 3 there is shown an inlet adapter 30 above a throttle body assembly 20 (more particularly shown in FIG. 4). Four screws 31-34 (three shown) unite the inlet adapter 30 to the throttle body assembly 20 with a circular seal 35, to sealingly enable mass flow from upstream into the throttle body assembly 20. Similarly, the outlet adapter 40 is united with throttle body assembly 20 using screws 41-44 with a circular seal 45, to sealingly enable mass flow downstream from the throttle body assembly 20. Although of secondary importance, it may be noted that the inlet adapter 30 and outlet adapter 40 are more beneficial when throttle 10 is being used as an MFG throttle, as opposed to when it is being used as an MFA throttle.

Although each of the plurality of spaces defined by the unitary block assembly and that collectively contain the rotary shaft 710—namely the PCB space, the motor space of intermediate housing 800, the throttle body space, and the spring return assembly space of assembly 50—are formed by sealed uniting of adjacent sub-blocks, leakage may still occur from one such space to the next due to the imperfect seals around a rotating shaft 710. Accordingly, to protect the control circuitry of PCB 900 from the corrosive effects of gaseous fuel supplies, electronic components of PCB 900 are coated with a coating that is protective of such electronic components against the otherwise corrosive characteristics of gaseous fuels.

Figure 4:
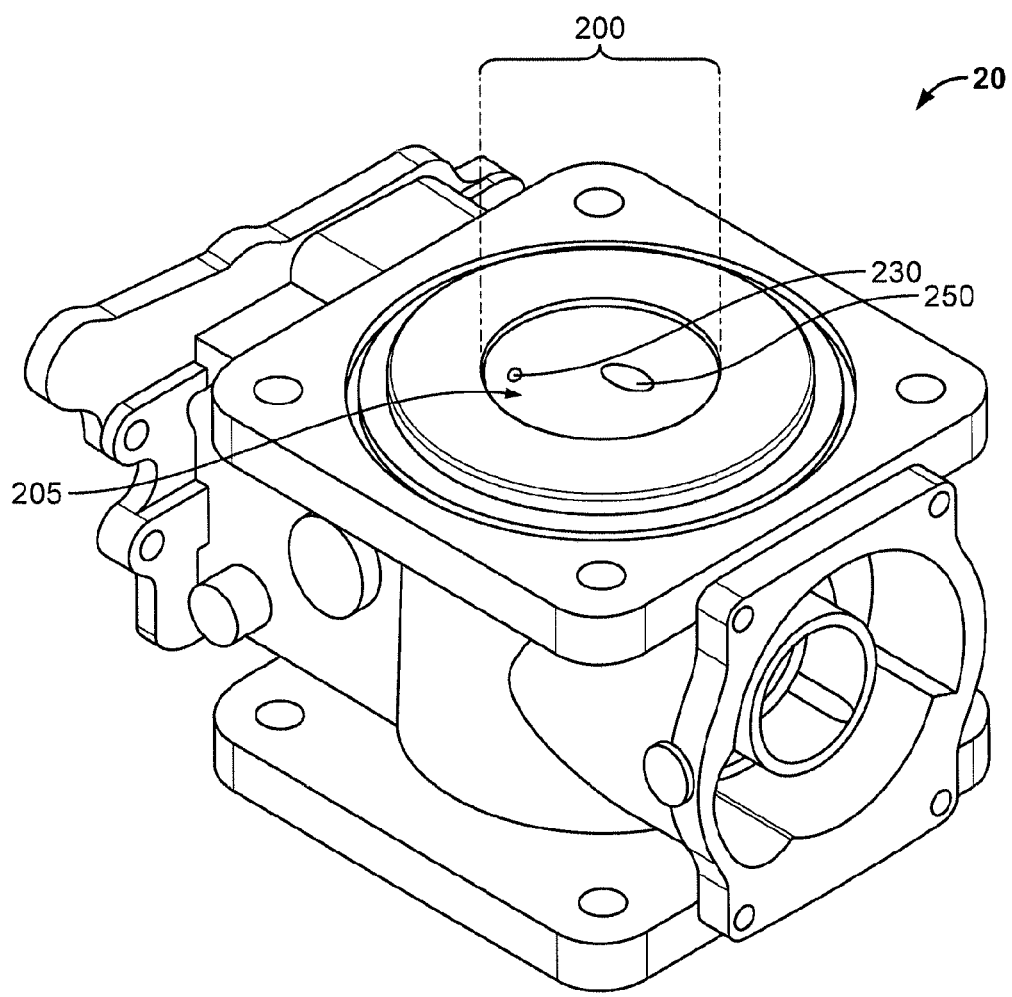
FIG. 4 is a perspective view of the throttle body assembly 20.
Figure 5:
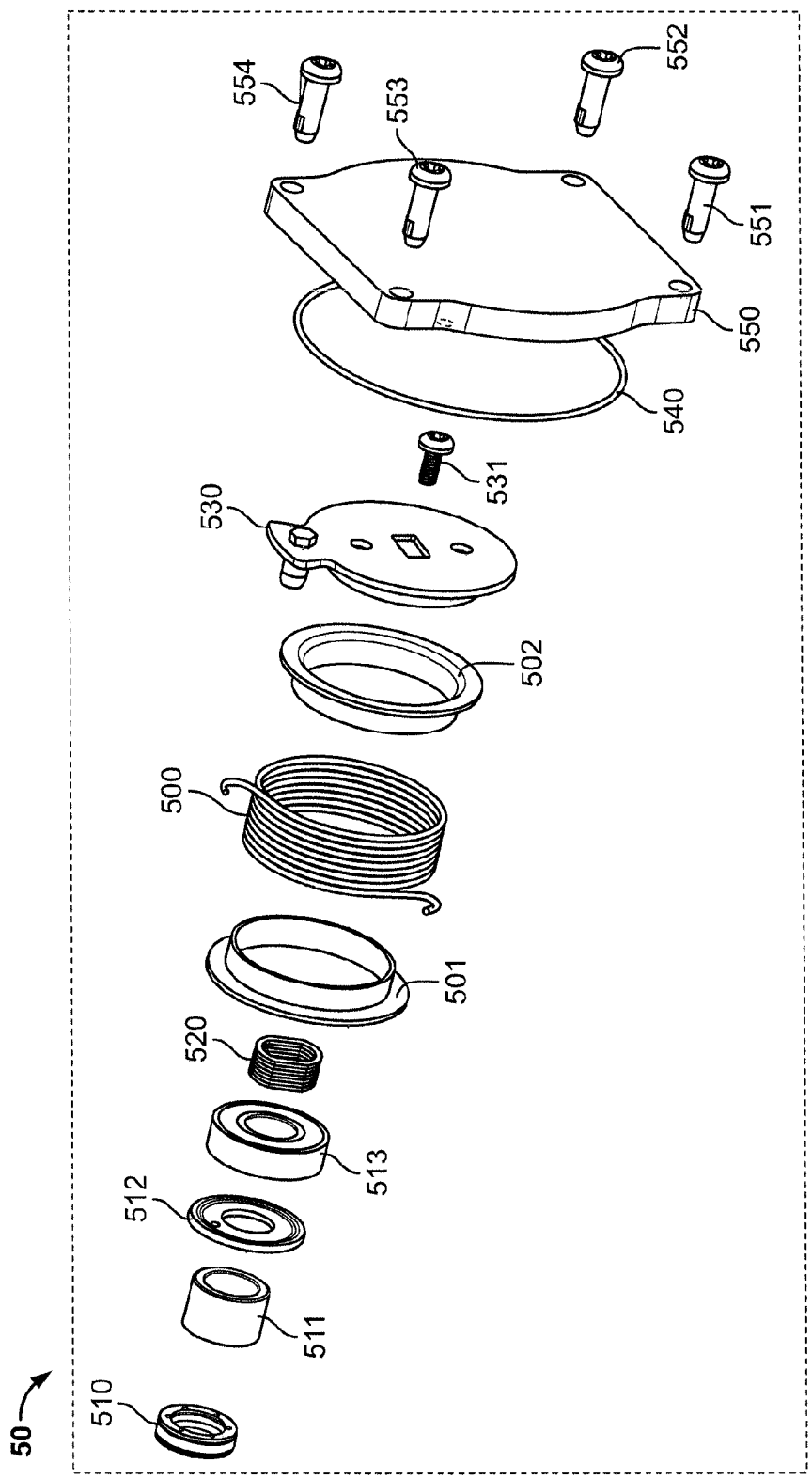
FIG. 5 is an exploded perspective view of spring assembly 50.

To the right of throttle body 20 is a spring assembly 50 (shown in detail in FIG. 5). The spring assembly 50 operates as a torsion type spring that winds up while the block assembly 10 is powered on. When the block assembly 10 is powered off, the spring assembly 50 winds down and returns to a closed position or, more preferably, to a substantially closed position. To the left of throttle body 20 is a thermistor assembly 60 (shown in detail in FIG. 6) that senses temperature. Also, to the left of throttle body assembly 20 is a motor and throttle shaft assembly 70 (shown in detail in FIG. 7) that controls the movement of the throttle (shown in FIG. 4). An intermediate housing assembly 80 (shown in detail in FIG. 8) unites the motor and throttle shaft assembly 70 and a printed circuit board (PCB) assembly 90 (shown in detail in FIG. 9).

Figure 5A:
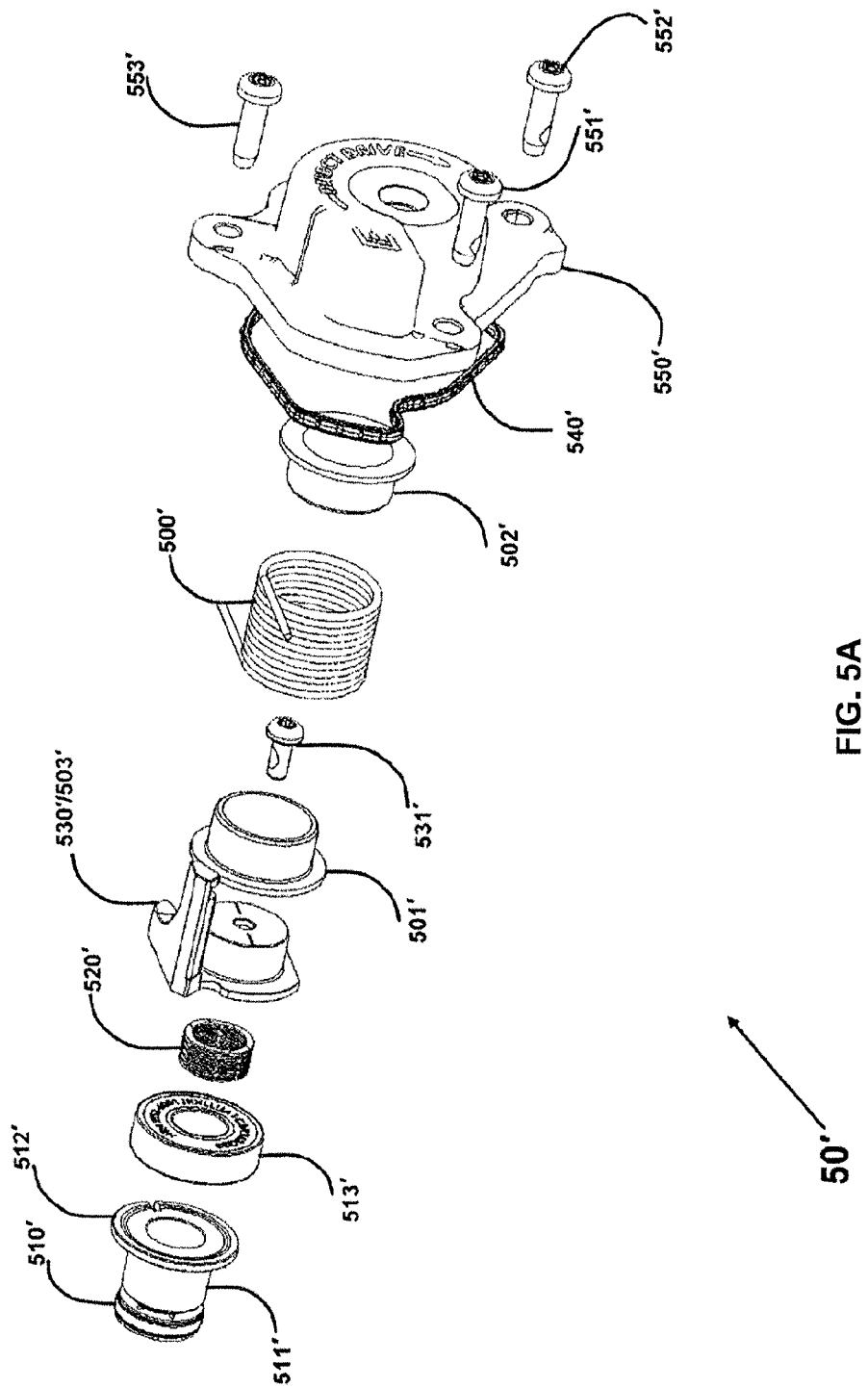
FIG. 5A is an exploded perspective view of spring assembly 50' of the alternative embodiment of large engine throttle 10' of FIG. 3A.

As an alternative to the embodiments of FIGS. 3 and 5, FIGS. 3A and 5A show a comparable but alternative embodiment. However, due to the close similarities of throttle 10' as compared to throttle 10, the parts in each of FIGS. 3A and 5A are numbered similarly to the comparable parts of FIGS. 3 and 5, with the main difference being the addition of a prime symbol ("'") for the components of the embodiment of FIGS. 3A and 5A. Particularly, with reference to FIG. 3A, most all the subassemblies of the throttle 10' are practically similar to those of throttle 10 of FIG. 3, with the most notable exception being the spring return assembly 500', which has components analogous but different from those of spring return assembly 500.

Nonetheless, details of FIG. 5A are different enough from those similar details of FIG. 5 that some description may be helpful. Particularly, component 510' of FIG. 5A is a shaft seal. In this embodiment, seal retainer 511' and 512' are merged as one component. Part 501' is a bushing separator that supports spring 500,' and screw 531' screws the assembly 50' to the end of the throttle shaft 710. D-shaped cutout in the screw 531' tend to orient the spring assembly to the desired orientation on the shaft 710. Bearing assembly 513' is a conventional bearing assembly much like bearing assembly 513 and element 520' is a bearing freeload spring. Part 530' is spring return for returning throttle blade 210 to a five-degrees-from-fully closed position. Each end of the spring 500' has projecting flare that engages mating notches and the like to drive the spring-biased return of throttle blade 210, in a manner that is generally common for many spring-biased returns for automotive throttles.

Throttle Body Assembly 20

With reference to FIG. 4, there is shown an isometric view of the throttle body assembly (also referred to as "gaseous supply throttle") 20. As previously discussed, a throttle body assembly 20 may be used for controlling fuel flow rates, air flow rates, or fuel-air mixture flow rates. The cylindrically shaped volume of space from the top to the bottom of throttle body assembly 20 is defined herein as the throttle chamber 205. For fuel throttles, the throttle orifice 200 is preferably between 50 millimeters and 76 millimeters in diameter. For fuel-air throttles, the throttle orifice 200 is preferably between 60 millimeters and 120 millimeters in diameter. Note that, although throttle orifice 200 is a circular-faced orifice in a preferred embodiment, other shapes may be used in alternative embodiments such as a square-shaped orifice.

Spring Assembly 50

With reference to FIG. 5, there is shown an exploded view of the spring assembly 50. On the left side of FIG. 5 is a throttle shaft seal 510 (with insert) that seals the throttle shaft 710 (shown in FIG. 7). A throttle seal spacer 511 separates the throttle shaft seal 510 from a seal retainer washer 512. A roller bearing 513 is located between the seal retainer washer 512 and a wave spring 520. A spring guide bearing 501 prevents torsional spring 500 from contacting or rubbing against the body of throttle 10. A larger spring guide bearing 502 separates the torsional spring 500 from a spring return flange 530. A screw-like perpendicular pin 531 located in the center of flange 530 of the spring assembly 50 serves to transmit the neutrally biasing force of spring 500 to the shaft 710 and, in turn, to throttle blade 210. Screws 551-554 fasten the spring return cover 550 to the throttle body assembly 20, and an O-ring 540 sealingly unites the assemblies. With reference to the alternative embodiment of FIG. 5A, there is shown another exploded view of a spring assembly 50', which is structured comparably and functions in a manner generally comparable to spring assembly 50.

Thermistor Assembly 60

Figure 6:
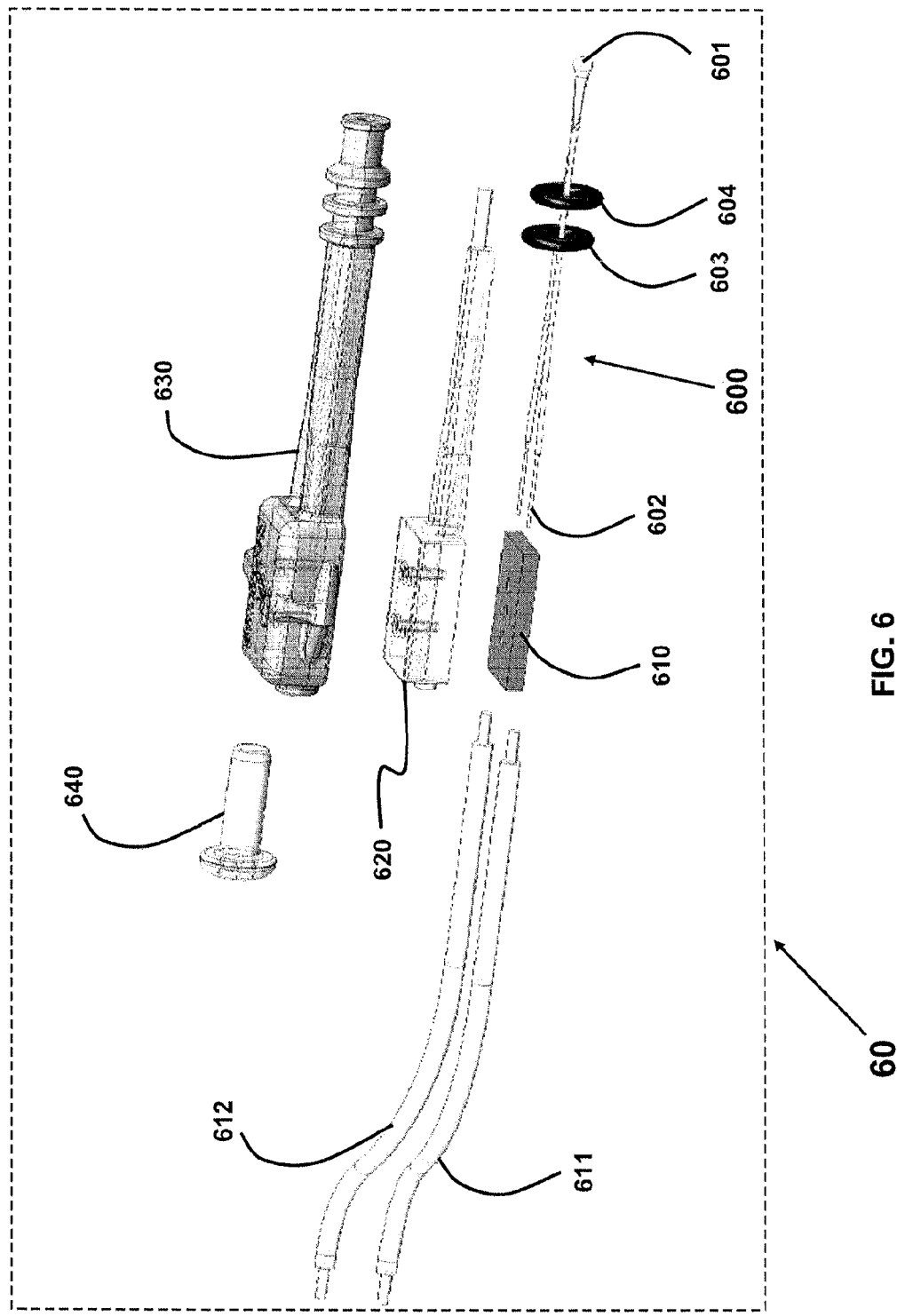
FIG. 6 is an exploded perspective view of thermistor assembly 60.

With reference to FIG. 6, there is shown an exploded view of the thermistor assembly 60. In one embodiment, the thermistor 600 has a temperature measurement range from −70° C. to 205° C. The thermistor assembly 60 has two O-ring gaskets 603 and 604 that function as sealants. Lead wires 611 and 612 are soldered to thermistor PCB 610, extend (not shown) through the intermediate housing assembly 80, and are also soldered to the main PCB 900. An epoxy overmolding 620 is used to protect the thermistor 600 and thermistor PCB 610. A thermistor tube 630 encloses the epoxy overmolding 620, thermistor 600, and thermistor PCB 610. The thermistor tube 630 is united with the throttle body assembly 20 using a screw 640.

Motor and Throttle Shaft Assembly 70

Figure 7:
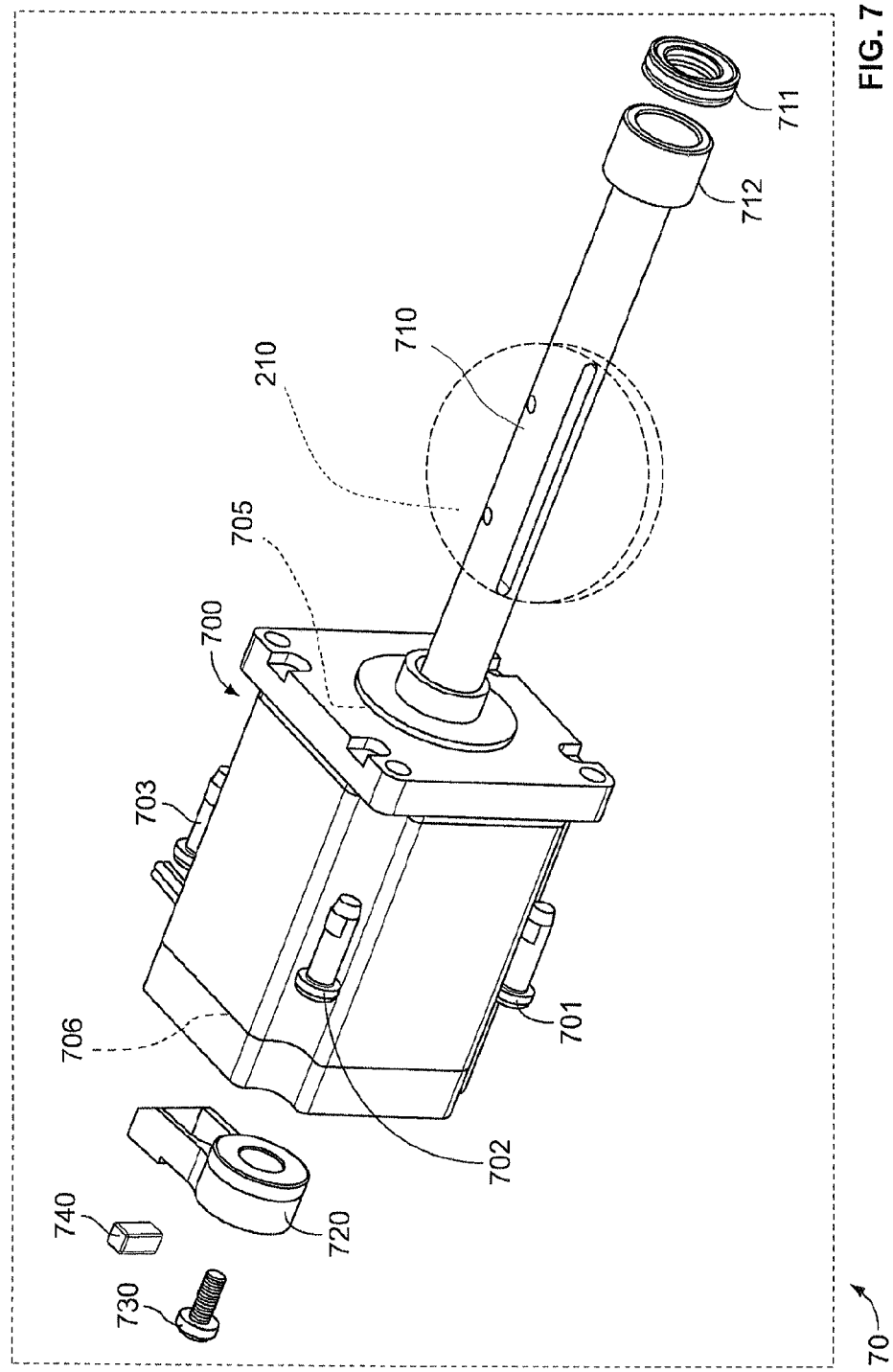
FIG. 7 is an exploded perspective view of motor and throttle shaft assembly 70.

With reference to FIG. 7, there is shown the motor and throttle shaft assembly 70. A brushless motor 700 controls the movement of the throttle shaft 710. On the right side of FIG. 7 is a throttle shaft seal (with insert) 711. A throttle seal spacer 712 separates the throttle shaft seal 711 from the throttle shaft 710. Four screws 701-704 (three shown) unite the brushless motor 700 and the throttle shaft 710 with the throttle body assembly 20. The throttle shaft 710 extends all the way through the brushless motor 700 and connects to a rotor arm 720. There are two rotary bearing assemblies 705 and 706 within motor 700 such that, together with the rotary bearing assembly 513 (or 513' in the embodiment of FIG. 3A), three bearing assemblies support the rotatable movement of shaft 710. A screw 730 integrally fastens the rotor arm 720 to an end of the throttle shaft 710 that protrudes into the PCB space from the left side (as viewed in FIG. 7) of the brushless motor 700. The rotor arm 720 has a permanent magnet 740 permanently attached to a radially outward portion of rotor arm 720, such that arm 720 can be used in conjunction with a magnet 740 to indirectly measure the position of the throttle blade 210 in its range of rotatable motion.

Intermediate Housing Assembly 80

Figure 8:
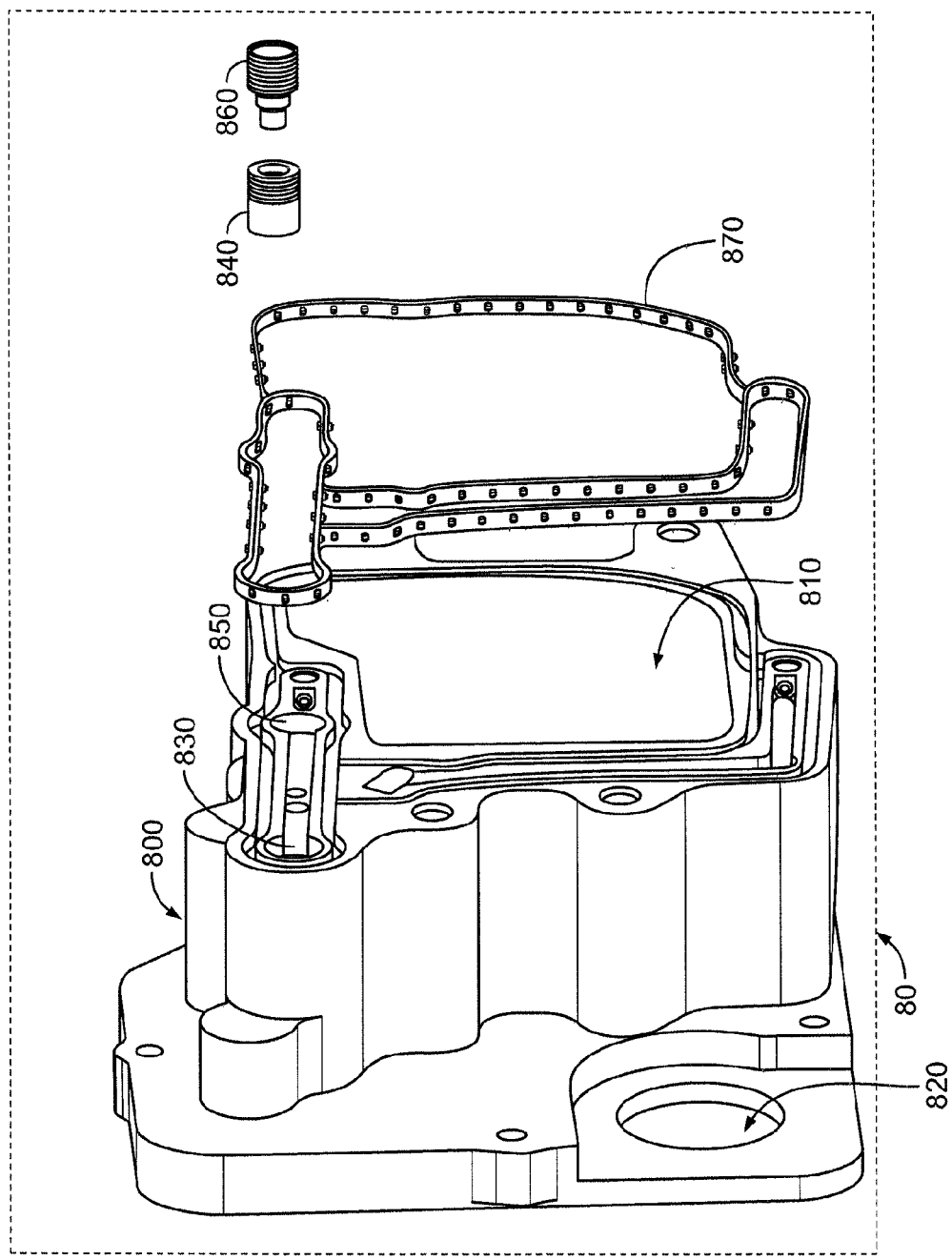
FIG. 8 is an exploded perspective view of intermediate housing assembly 80.

With reference to FIG. 8, there is shown the intermediate housing assembly 80. A large open space 810 is used for housing the brushless motor 700. A smaller circular opening 820 at the bottom left is used for housing the controller-area-network (CAN) pin connector that protrudes from the main PCB 900. One small opening 830 at the top of the assembly 80 houses a reverse flow check valve 840, to protect sensors from over-pressurization. Another smaller opening 850 houses a forward flow check valve 860 to protect sensors from over-pressurization. An in-groove seal 870 shaped to fit the intermediate housing assembly 80 sealingly unites assembly 80 to the throttle body assembly 20.

Printed Circuit Board (PCB) Assembly 90

Figure 9:
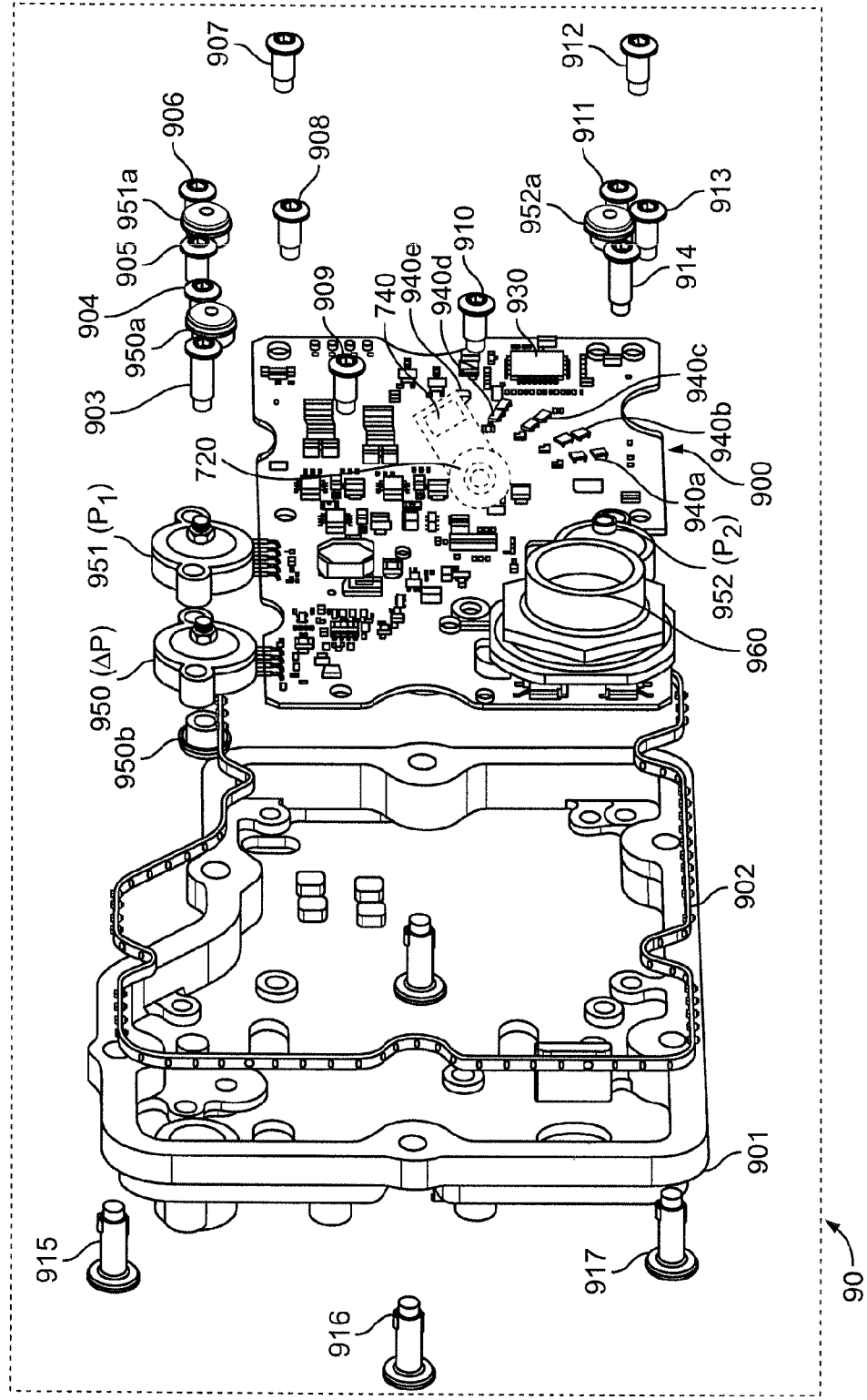
FIG. 9 is an exploded perspective view of PCB assembly 90.

With reference to FIG. 9, there is shown the PCB assembly 90, which sealingly contains PCB 900. The PCB 900 is enclosed in a space (the "PCB space") defined between a PCB housing cover 901 and intermediate housing 800, which are united by screws 915-920 in a sealed manner. The sealed union between cover 901 and intermediate housing 800 is partially enabled by an in-groove elastic seal 902 positioned perimetrically around the PCB space in the interface between intermediate housing 800 and PCB housing cover 901. Twelve screws 903-914 securely fasten the PCB 900 and pressure sensors 950-952 to the PCB housing 901. Six screws 915-920 (three shown) and a PCB housing seal 902 sealingly unite the PCB assembly 90 with the intermediate housing assembly 80 (shown in FIG. 8). Such sealed integration enables optimal control and helps minimize extraneous artifacts or other influences that might otherwise affect its operation.

PCB 900 comprises a microcontroller 930, which can be any commercially available microcontroller with a memory that is capable of receiving machine readable code, i.e., software. The microcontroller 930 provides the "brains" of the large engine throttle 10. Microcontroller 930 receives throttle position signals from Hall Effect sensors 940*a-e*, pressure signals from pressure sensors 950-952, temperature signals from the thermistor 600, and control signals from the ECM 100. The microcontroller 930 uses an algorithm to calculate throttle position in order to achieve the instantaneously desired mass flow rates and then outputs pulse width modulated and H-bridge signals to motor 80 to cause motor 700 to properly control the position of throttle blade 210, while also outputting measured data to the ECM.

PCB 900 has five pairs of identical Hall Effect sensors 940*a-e* which are part of a position sensor assembly for indirectly detecting the position of throttle blades 210. With cross reference to FIG. 10, these sensors are collectively named "Blade Position Sensor" 940. As the throttle shaft 710 rotates, the rotor arm 720 which is an integral part of shaft 710 rotates within the PCB space and this causes the magnet 740 to move relative to the Hall Effect sensors 940*a-e*, which are able to detect the resulting changes in the magnetic field. These sensors 940*a-e* vary their output voltage in response to magnetic field changes and these electrical signals are processed by the microcontroller 930. The sensors 940*a-e* are used for calibrating the location of the throttle blade 210 relative to the strength of the magnetic field given by the magnet 740.

Delta-P sensor 950 is a double-sided pressure transducer that measures the differential pressure ("Delta-P") between the upstream pressure port 230 and downstream pressure port 240. Two pressure sensor gaskets 950*a* and 950*b* seal Delta-P sensor 950. Upstream pressure sensor 951 measures the absolute upstream pressure ("$P_1$") and has pressure sensor gasket 951*a*. Downstream pressure sensor 952 measures the absolute downstream pressure ("$P_2$") and has pressure sensor gasket 952*a*. The Delta-P sensor 950 is significantly more accurate in measuring the differential pressure than the method of mathematically subtracting the difference between $P_1$ and $P_2$. However, there are conditions when the throttle operates at pressures out of range of the Delta-P sensor 950. When the Delta-P sensor 950 begins to peg (ie, approaches its maximum reliable limits), the microcontroller 930 will begin using pressure sensors 951 and 952 to calculate the differential pressure. Once the maximum pressure range is exceeded, the microcontroller 930 will stop using Delta-P sensor 950 and switch entirely to pressure sensors 951 and 952 in addition, PCB 900 will troubleshoot other instances whenever $P_1$, $P_2$ and/or Delta-P do not conform to rationality checks, in such cases a false signal is sent to ECM 100.

Pressure sensors 951 and 952 are conventional pressure transducers, although non-conventional ones (or even sensors or the like for fluid conditions other than pressure) can be considered for use as alternatives for some of the same purposes. Pressure transducers 951 and 952 are preferably of the type that can be and are mounted to PCB 900 and have stiff tube connectors (sometimes called "stove pipes") extending from their bases, through which the transducers access the pressure to be sensed.

To neutralize some of the effects of pressure fluctuations—particularly downstream pressure fluctuations—the control algorithms of microcontroller 930 preferably use time-averaged pressure readings from the pressure sensors 950-952 rather than instantaneous pressure readings. More particularly, based on the number of cylinders and the current RPM of the engine, as received by microcontroller 930 from ECM 100, microcontroller 930 continuously determines the stroke cycle time for the pistons of engine 102

FIG. 10—Block Diagram

In the illustrative block diagram of FIG. 10, there are four main segments of supply flow depicted for preferred embodiments: (1) an upstream gaseous fuel supply 350 depicted on the left; (2) a large engine throttle 10 depicted within the dashed-line box in the middle; and (3) an engine 102 depicted in the smaller dashed-line box further to the right. The three segments 350, 10, and 102 are operatively connected to provide rotary shaft power for any number of large engine applications, with fuel supply 350 serving as the basic gaseous fuel supply for engine 102, and with large engine throttle 10 serving to provide accurate control of the gaseous fuel flowrate from that fuel supply 350 to engine 102, in accordance with various teachings of the present invention.

Upstream Fuel Supply 350

As illustrated in FIG. 10, fuel supply 350 preferably includes a fuel tank 360 serving as the source for fluid fuel, together with a mechanical pressure regulator 370 and other conventional components such as a shut-off gate valve 380. Valve 380 is preferably controlled by ECM 100, although independent control may be utilized in alternative embodiments. The gaseous fuel supply 350 is equipped and adapted to deliver a gaseous fuel supply to supply inlet 390 at desired pressure levels.

More preferably, the gaseous fuel supply 350 is a natural gas or vaporized propane fuel supply that delivers natural gas or propane stored in fuel tank 360. Though not shown in FIG. 10, fuel tank 360 may be equipped with vaporization subassemblies and controls to manage LNG (liquefied natural gas) or propane vaporization and resulting pressure within fuel tank 360 and the associated lines 365, 375 and 376. Such vaporization subassemblies and controls for LNG preferably prime tank 360 by pre-circulating some of the stored LNG through a heat exchange loop that increases the temperature of the pre-circulated LNG to the point of partial or complete vaporization, thereby creating a vapor phase with an adequate pressure head within tank 360. Line 365 preferably also includes a second heat exchanger downstream of the fuel tank 360, to further aid in complete vaporization of the LNG or propane once gaseous fuel is allowed to flow from fuel supply 350 to large engine throttle 10.

Downstream of the heat exchanger in line 365, the gaseous fuel is directed sequentially through a mechanical pressure regulator 370, a downstream fuel shut-off valve 380, and a line quick-disconnect assembly (not shown) prior to entry into large engine throttle 10. In this embodiment, initial fuel pressure is supplied by the tank 360, although the initial pressure from tank 360 is preferably regulated by mechanical pressure regulator 370 before reaching supply inlet 390 of large engine throttle 10. Mechanical pressure regulator 370 is able to manage the low pressures from tank 360 and includes one or more conventional pressure regulators that use pressure-balanced diaphragms to vary effective orifice sizes and thereby control the pressure to within the preferred range at supply inlet 390. Mechanical pressure regulator 370 preferably includes an integrated pressure sensor for providing upstream pressure data (i.e., equivalent to the pressure "$P_1$" at supply inlet 390) to ECM 100 via control link 371. Whether or not a pressure sensor is integrated with regulator 370, the preferred embodiment includes a pressure transducer 951 that measures the pressure at port 230, which is upstream of throttle blade 210 and which is in fluidic proximity to supply inlet 390, such that it is the same as $P_1$, for reliable input on the actual pressure of the gaseous supply entering throttle 10.

Assuming all lines 365, 375 and 376 are operatively sealed and connected to direct supply flow therethrough, supply flow from fuel supply 350 to large engine throttle 10 is enabled or disabled by On/Off operation of a mechanical shut-off valve 380. Although manual valves may be used in certain alternative embodiments, valve 380 is preferably motor or solenoid actuated via oversight control by ECM 100, as illustrated by the dotted-line control link 381 in FIG. 10. When shut-off valve 380 is open, gaseous supply flow is induced by an operable pressure gradient between tank 360 and supply inlet 390. Hence, with valve 380 open, fuel first moves through the heat exchanger and the mechanical pressure regulator(s) 370, and the fuel is then directed through the valve 380 and into the fuel inlet 390.

Despite vaporization subassemblies and controls, the potential exists for the passage of vaporized natural gas or propane fuel that also contains droplets of liquid phase LNG or propane, which may occur for instance if the ports or conduits for heat exchange fluids become clogged. If any LNG or propane droplets remain in the fuel stream downstream from the mechanical pressure regulator(s) 370, their subsequent vaporization may introduce dramatic pressure spikes into large throttle engine 10, which would overwhelm large throttle engine 10. In order to compensate for the possible introduction of LNG or propane droplets downstream of the heat exchanger, a pressure control loop may be inserted into the system in a position intermediate between the pressure regulator(s) 370 and the supply inlet 390 to large engine throttle 10, preferably downstream of the heat exchanger and mechanical pressure regulator(s) 370.

In the event any errant droplets of LNG or propane enter into large engine throttle 10, the delayed vaporization would likely lead to a spike of increased pressure at the supply inlet 390 of the large engine throttle 10. If such a pressure spike is produced, the inserted pressure control loop preferably buffers the spike by venting back to the upstream side of the mechanical pressure regulator 370. As other alternatives, one or more overpressure vents or bypass check valves can be included in line 375 and/or 376 to help divert vaporization spikes that would otherwise propagate and disrupt the control of large engine throttle 10. Similarly, pressure spikes due to fuel vaporization upstream of the mechanical pressure regulator can also be vented to atmosphere and/or diverted to other containment further upstream in fuel supply 350.

By providing a multi-faceted strategy for control of such errant pressure spikes, namely through the inclusion of a heat exchanger in line 365 as well as one or more of the vents, check valves or the like as discussed above, preferred embodiments control and modulate the pressure introduced to the supply inlet 390 to reduce or prevent overwhelming the flowrate control of large engine throttle 10.

The fuel tank 360 may alternatively be embodied as any of a number of commonly available gaseous fuel sources, such as stationary gas pipelines, compressed gas cylinders, or other types of liquefied storage tanks with vaporization controls, together with conventional pressure regulators and the like. Preferably, most such alternatives still include some form of a fuel storage tank 360 that feeds fuel to large engine throttle 10 via a high-pressure mechanical pressure regulator 370 which regulates the pressure to a desired range for the supply inlet 390.

Again, from the high-pressure mechanical pressure regulator 370, the fuel is fed through a fuel tube or supply line 375, which preferably includes a shut-off gate valve 380 as shown. Downstream from shut-off gate valve 380, the fuel supply line 376 is connected to the large engine throttle 10 at supply inlet 390, at which point the fuel is preferably introduced into the gaseous supply throttle 20 of large engine throttle 10.

As will be understood by those of skill in the art, the supply line 375 may also include a fuel filter (not shown) or other conventional systems for monitoring and/or optimizing fuel supply conditions prior to introduction into large engine throttle 10. Such other systems may include, for instance, fuel quality sensors connected to the engine control module (ECM) 100 and/or the PCB 900 of large engine throttle 10 for anticipating operating needs. The fuel supply 350 may also include a combination of several independent pressure regulators 370 (rather than just one) or may include additional pressure regulators that are integral to the fuel storage tank 360.

Referring again to the preferred embodiment as illustrated in FIG. 10, the large engine throttle 10 includes a fuel supply 350. Downstream of that large engine throttle 10, the supplied fuel flow is then blended with air 160 for supplying a gaseous fuel-air mix 150 to internal combustion engine 102. While the FIG. 10 arrangement is preferred, alternative embodiments in line with some broader teachings of the present invention may alternatively introduce some or all of the required air into the fuel upstream of large engine throttle 10 (as suggested by alternate air mixing flow arrow 260'), albeit with corresponding challenges and possible compromises given that corresponding adjustments may be needed to account for the air flow introduction at whichever point it is introduced.

Gaseous Supply Throttle 20

Linked to the ECM 100 of engine 102 via the communication link illustrated by dotted line 101, gaseous supply throttle 20 is adapted to provide rapid and highly accurate control of the actual ṁ supply flowrate at its outlet 170 in response to them flowrate signal 105, for controlled delivery of the fuel supply to the fuel-air mixer 161 and subsequently the engine 102. By its nature, gaseous supply throttle 20 is used to control gaseous supply flow from a primary fuel supply 350 (on the left in FIG. 10) to an internal combustion engine 102 (on the right in FIG. 10). Accordingly, gaseous supply throttle 20 is operatively positioned downstream of the fuel supply 350 and upstream of the fuel-air mixer 161 and engine 102, such that it is plumbed and sealed to be part of a fluidly continuous fuel supply system during operation of engine 102, with gaseous supply throttle 20 being intermediate the fuel supply 350 and the engine 102. A detailed description of large engine throttle 10 with references to additional figures is made in ensuing paragraphs.

For further optimization, the in-block microcontroller 930 and related control circuitry are preferably embodied on a single printed circuit board 900 (also visible in FIG. 9). The in-block microcontroller 930 of PCB 900 is connected via data link 101 to receive them data signal 105 (and all other available data, including a $P_3$ data signal 121, if needed, as discussed elsewhere herein) from ECM 100. Data link 101 connects to ECM 100 and its control network, which is a CAN network in the preferred embodiment. Using the received data signals 105, 120, the printed circuit board 900 controls large engine throttle 10, preferably without any external communication other than power and data connection 101 to the engine's ECM 100. Although "CAN" is technically an acronym for controller-area-network, the "CAN" reference is a commonly used technical word that refers to a CAN network or to data received via a CAN network. On that note, it should be recognized that although a CAN network is the preferred communication link for communication of all commands, variables and other data received through line 101 by microcontroller 930 from outside of throttle system 10, wireless, analog signals, digital signals, or other communication means may be used as alternatives while still embracing many aspects of the present invention.

Also located on the PCB 900 is the CAN network connector 960 (visible in FIG. 2B). As will be understood by those of skill in the art, CAN network connector 960 is a five-pin connector. The five pins comprise a power pin, a ground pin, a CAN plus pin, a CAN minus pin, and a CAN termination pin. As will be understood by those of skill in the art, alternative embodiments could be direct (0-5V or 5-20 milliamp) data connections or any other known alternative for data connections that are otherwise suitable for an application such as large engine throttle 10. Alternative embodiments may have eight pin connectors instead of the five pins for a CAN network.

In the preferred embodiment, optimal fluid condition feedback is obtained from double sided transducer ("Delta-P sensor") 950 by positioning the tips of its stove pipes (or a tube therefrom, as an alternative) in direct fluid contact with throttle chamber 205 (shown in FIG. 4), while the base of transducer 950 is mounted directly on PCB 900. With cross-reference to FIG. 2B, Delta-P sensor 950 measures the differential pressure ("Delta-P") between the upstream pressure port 230 and downstream pressure port 240. Pressure sensor 951 measures the absolute upstream pressure ("$P_1$") from port 230. Pressure sensor 952 measures the absolute downstream pressure ("$P_2$") from port 240. With further cross-reference to FIG. 2B, the stove pipe tips of pressure sensors 951 and 952 extend from PCB 900 through appropriately positioned sensor ports 230 and 240 in a side wall of throttle chamber 205. To minimize clogging or other fouling of transducers 950-952, ports 230 and 240 are preferably in a side compartment of throttle chamber 205 and are shielded through use of downwardly sloping passages or other measures as are known for use as contamination preventers.

With cross-reference to FIG. 6, optimal fluid condition feedback is obtained by positioning the sensor tip 601 of thermistor 600 directly within throttle chamber 205, while the base 602 of thermistor 600 is soldered directly to thermistor PCB 610. Thermistor 600 is a conventional thermistor that senses temperature at its tip 601 and has wire leads extending to the sensor tip 601, although other forms of temperature sensors (or even sensors or the like for fluid conditions other than temperature) can be considered for use as alternatives for some of the same purposes.

Throughout the control of in-block microcontroller 930, embodiments of the present invention address long felt unresolved needs in the field through innovative approaches that overcome many of the limitations and challenges of the prior art. In accord with many of the teachings of the present invention, the industry is enabled to provide solutions manifested in large engine control systems that are readily adaptable to the power demands of numerous applications and are readily capable of highly accurately and precisely controlling supply flow across sizable dynamic power ranges in internal combustion engines.

Engine 102

With reference again to FIG. 10, Engine 102 is a large spark-ignited internal combustion engine 102 of a type that uses gaseous fuel as its primary energy source, most preferably of a type that uses natural gas (NG) or vaporized propane (LPG) as its fuel. A large engine is defined here as any engine that is 30 liters or greater. Engine 102 is preferably used in stationary applications such as generator sets (hereinafter "gensets") on natural gas compression skids. Alternatively, engine 102 may be used in large mobile applications such as trains, ships, mining trucks or other heavy-duty vehicles. As is conventional, engine 102 has an ECM 100 or the equivalent, which continually monitors the operating conditions of various parts of engine 102 and its peripheral systems. Such an engine 102 may be operatively incorporated in any number of powered applications in alternative embodiments, as well as many other applications that may be now or in the future known in the art for being powered by spark-ignited gaseous-fuel internal-combustion engines.

ECM 100 of engine 102 is connected via data communication lines 181-182 or other conventional means to monitor pressures, temperatures and operating states in or around numerous subsystems of engine 102, such as its fuel-air handling system (that preferably includes a turbo charger 172), a fuel-air throttle 140, its ignition system, its combustion chambers 180, its coolant system, its oil pressure, and its exhaust system, amongst others as are known in the art. Although alternative embodiments may use wireless connections for some or all of the data connections between ECM 100 and the various subsystems of engine 102, preferred embodiments of ECM 100 are connected to send and receive analog or digital signals through wire harnesses or other forms of communication lines 101, 181, 182, 182$a$, 182$b$, 371, and 381. Though represented in FIG. 10 by the various dotted-line communication links directly between the various components, communication lines 101, 181, 182, 182$a$, 182$b$, 371, and 381 are preferably embodied in the form of a conventional data network, such as a controller-area-network ("CAN") network.

As will be understood by those skilled in the art, ECM 100 is programmed to operate, in part, to determine the desired supply flowrate ("ṁ" or "mdot") 105 at any given instant in time, based on current operating conditions of engine 102 in comparison to current user demands. As the desired ṁ flowrate is determined by ECM 100, the ECM produces a corresponding ṁ data signal 105 that represents the current ṁ flowrate demand for engine 102. As the desired ṁ flowrate is determined by ECM 100, the corresponding ṁ data signal 105 is conveyed by communication link 101 to the microcontroller 930 of large engine throttle 10, and large engine throttle 10 operatively serves to instantaneously and accurately deliver as much from throttle system outlet 170.

After the flow control by large engine throttle 10, the controlled flow of gaseous supply from the throttle system outlet 170 is directed to fuel-air mixer 161 where it is preferably mixed with air 160, to produce a combustible fuel-air mix 150. Preferred embodiments use a flow of filtered air 160. The intake air 160 that is directed into the fuel-air mixer 161 may be drawn from ambient air in alternative embodiments, with or without pressure compensators, albeit with performance compromises. Fuel-air mixer 161 is preferably a venturi-like mixer or another type that does not use moving parts in the supply flow, thereby maximizing durability and fuel/air mixture homogeneity of flow conditions actually delivered to combustion chambers 180. Most preferably, fuel-air mixer 161 is in a form that includes a fuel ring, to help preserve the benefit of the accurate ṁ flowrate control provided by throttle system 10.

Once the proper fuel-air mixture 150 is provided by fuel-air mixer 161, that mixture 150 flows toward engine 102. The fuel-air mixture 150 passes through a turbocharger 172. The turbocharger 172 takes in recirculated gas from the pre-turbo exhaust 171, mixes it with fuel-air mixture 150 and compresses it. After leaving the turbocharger 172, the fuel-air mixture 150 passes through a turbo aftercooler 174. The turbo aftercooler 174 cools fuel-air mixture 150 before it enters the engine 102. It is necessary to reduce the temperature of the fuel-air mixture to allow for a denser intake to the engine 102, thereby increasing the output of the engine 102. The post turbo exhaust gas 173 flows into a three-way catalytic converter (TWC) 175. As will be understood by those of skill in the art, the TWC 175 reduces pollutants prior to the exhaust gas being released to the environment. Although not illustrated in the drawings, those of skill in the art will understand that preferred embodiments would include various components that are not shown. Moreover, other components like filters and pressure relief valves are also not shown. With respect to any such simplifications and omissions from the drawings, it should be understood that preferred embodiments include them in such character and configuration as would be generally understood within the discretion of those of skill in the art.

The flow of fuel-air mixture 150 is controlled by fuel-air throttle 140, which is preferably an electronic throttle that further facilitates preservation of the highly accurate flowrate control provided by the supply throttle 10 in FIG. 10. Accordingly, fuel-air throttle 140 is preferably also constructed with the same basic structure and software as throttle 10, albeit preferably with adaptations to accommodate the different pressure ranges that would be experienced downstream of mixer 161 and perhaps with less protection of internal components against the corrosive effects of more concentrated fuels, as would be encountered upstream of mixer 161. Because FIG. 10 plumbs and uses throttle 10 to control the mass flowrate of the fuel itself, that type of throttle deployment is sometimes referred to as mass-flow-gas throttle (or an "MFG" throttle). In contrast, the fuel-air throttle 140 that is used to achieve highly accurate control of the mass flow of the fuel-air mixture 150 is sometimes referred to as a mass-flow-air throttle, or an "MFA" throttle, irrespective of whether or not the fuel is mixed with the air at the point of that control.

Preferably, the fuel-air throttle 140 is also constructed according to the teachings of the present invention, with the same basic structure as the supply flow throttle 10 that is used as an MFG throttle to control the mass flow of the fuel by itself. Hence, the highly accurate fuel supply flow of the MFG throttle 10 in FIG. 10 is preferably combined with highly accurate air supply mass flow control achieved by a fuel air throttle 140 constructed according to the same basic teachings as the MFG throttle 10. Alternatively, complete and highly accurate mass flow control can also be achieved by combining an MFG throttle together with an MFA throttle that is plumbed in the air supply 160 upstream of the fuel-air mixer 161. Either such combination, either the one illustrated in FIG. 10 or the alternative combination of using a similar throttle to control the mass flow of air 160 by itself, enables comprehensive mass flow control of all supply flows for combustion. Moreover, generally accurate overall control might also be attainable by just controlling the mass flow of the fuel, without actively controlling the mass flow of the air if other reliable data is used to calculate that mass flow of the air, such as through use of oxygen sensors in combination with pressure, temperature and the like. Whatever the choice for a specific application, we trust that those of skill in the art will understand where and how to include such throttles for the different purposes to achieve the different combinations for overall mass flow control.

Whatever the choice, the resulting fuel-air mixture 150 is then operatively introduced into combustion chambers 180 of engine 102 under the control of ECM 100. Within combustion chambers 180, the fuel-air mixture 150 is then operatively spark-ignited to cause working combustion.

Surprisingly, the use of such an MFG throttle together with such an MFA throttle enables a dramatically streamlined development cycle for engines. Whereas large natural gas spark-ignited internal combustion engines have historically required considerable time and expense to finalize and validate the engine design prior to commercial release, the highly accurate mass flow control of the present invention enables a greatly simplified development, conceivable without any test cell expense. Although the industry will likely continue the use of test cells for finalizing designs, the accurate controls enabled by the present invention will allow much more relaxed standards in the process, not to mention the ability to achieve highly accurate mass flow control despite highly variable quality in fuel quality, air composition, and other environmental factors.

Throttle Control Strategy

As will be understood by those of skill in the art, the following mass flow rate equations are used to describe the non-choked flow of gases through an orifice. Equation (1) is the mass flow rate equation for ideal gases and equation (2) uses a gas compressibility factor "Z" to correct for the mass flow rate of real gases.

$$\dot{m} = CA_2 \sqrt{2\rho_1 P_1 \left(\frac{k}{k-1}\right)[(P_2/P_1)^{2/k} - (P_2/P_1)^{(k+1)/k}]} \quad (1)$$

$$\dot{m} = CA_2 P_1 \sqrt{\frac{2M}{ZRT_1}\left(\frac{k}{k-1}\right)[(P_2/P_1)^{2/k} - (P_2/P_1)^{(k+1)/k}]} \quad (2)$$

In these equations, "$\dot{m}$" is the mass flow rate; "C" is the dimensionless orifice flow coefficient; "$A_2$" is the cross-sectional area of the orifice hole ("effective area"); "$\rho_1$" is the upstream real gas density; "$P_1$" is the upstream gas pressure; "k" is specific heat ratio; "$P_2$" is the downstream gas pressure; "M" is the gas molecular mass; "$T_1$" is the absolute upstream gas temperature; "Z" is the dimensionless gas compressibility factor at "$P_1$" and "$T_1$"; and "R" is the universal gas law constant.

With reference to FIG. 10, the throttle control algorithm 990 determines the $A_2$ "effective area" needed to achieve the desired m flowrate using equation (2). $P_2$, $P_1$, and $T_1$ are measured as previously described and these values are used in equation (2). The microcontroller 930 is constantly utilizing the throttle control algorithm 990 to attain precise m flowrates while the parameters change. Once the "effective area" $A_2$ is determined by throttle control algorithm 990, a signal is transmitted to brushless motor 700. Brushless motor 700 is an actuator that controls the movement of throttle shaft 710, thereby adjusting throttle blade 210 of gaseous supply throttle 20 until the desired "effective area" $A_2$ is achieved. Brushless motor 700 is preferably a fast-acting actuator, preferably operable to move the throttle blade 210 through its entire range of motion in fifty milliseconds or less. Fast-acting actuators are preferably operable to move the actuated element through most of its operable range of motion (preferably from 20% to 80% of stroke), if not all of that operable range, in fifty milliseconds or less, although many other types of actuators are still likely to be suitable as alternatives, especially to the extent particular claim elements are not expressly disclaimed to require particular fast-acting characteristics.

Operating Pressures—Low Pressure

Although it will be understood that adaptations may be made for other upstream conditions, the pressure in the supply line 376 at the supply inlet 390 is preferably controlled by mechanical pressure regulator 370 to be approximately at a gauge pressure slightly above one atmosphere, although when throttle 10 is used as an MFG throttle, pressures could be as high as 2.5 bar absolute or, in the case of MFA application, as high as four bar absolute.

Although not necessary for highly accurate mass flow control, some methods of controlling large engine throttle 10 may also be further tuned to achieve the desired control depending in part on actual or estimated fluid conditions even further downstream, such as by a downstream sensor 121 monitoring pressure (designated as "$P_3$" for our purposes) that is monitored by ECM 100 and for which a representative data signal 120 is continuously available from ECM 100 (or from the data network associated with ECM 100). The particular $P_3$ value of data signal 120 represents any available data stream from engine 102 that is characteristic of pre-combustion fluid pressure within engine 102. Such a downstream sensor 121 may be a conventional temperature and manifold absolute pressure (TMAP) sensor module located in the engine's intake manifold downstream from fuel-air throttle 140. In addition to, or as an alternative to, a conventional TMAP sensor 121, downstream data can also be gathered from a conventional throttle inlet pressure (TIP) sensor module upstream of fuel-air throttle 140. Again, though, despite the plausible benefits of knowing the further downstream pressure $P_3$ for some variations of the invention, most preferred embodiments of throttle 10 omit consideration of $P_3$ data from sensor 121 as unnecessary, opting instead for simplicity and cost saving.

Alternative Fuels

Gaseous fuel for these purposes means a fuel that is in the gaseous state at standard operating temperatures and pressures. In presently preferred embodiments, the gaseous fuel is natural gas, derived from either a liquefied natural gas (LNG) or compressed natural gas (CNG) storage state. While the most preferred embodiments are adapted for use with these fuels, adaptations will be evident to those of skill in the art for use of aspects of this invention with other fuels in alternative embodiments. Such alternative embodiments are adapted, for instance, for use with hydrogen or other gaseous fuels such as propane, butane or other gas mixtures, including those common with liquefied petroleum gas (LPG) mixtures. Indeed, although the present invention is focused on the particular fields to which the preferred embodiments apply, it may also well be that some aspects of the invention may be found revolutionary in other fields as well.

Alternatives in General

While the foregoing descriptions and drawings should enable one of ordinary skill to make and use what is presently considered to be the best mode of the invention, they should be regarded in an illustrative rather than a restrictive manner in all respects. Those of ordinary skill will understand and appreciate the existence of countless modifications, changes, variations, combinations, rearrangements, substitutions, alternatives, design choices, and equivalents ("Alternatives"), most if not all of which can be made without departing from the spirit and scope of the invention.

Therefore, the invention is not limited by the described embodiments and examples but, rather, encompasses all possible embodiments within the valid scope and spirit of the invention as claimed, as the claims may be amended, replaced or otherwise modified during the course of related prosecution. Any current, amended, or added claims should be interpreted to embrace all further modifications, changes, rearrangements, substitutions, alternatives, design choices, and embodiments that may be evident to those of skill in the art, whether now known or later discovered. In any case, all equivalents should be considered within the scope of the invention, to the extent expressly disclaimed during prosecution or to the extent necessary for preserving validity of particular claims in light of the prior art.

The invention claimed is:

1. A throttle for a spark-ignited internal combustion engine for providing mass flow control of a gaseous supply flow for the engine based on an engine control signal that represents an instantaneously desired mass flowrate for the gaseous supply flow, said gaseous supply flow being a supply flow for combustion, wherein said throttle comprises:
  a. a unitary block assembly defining a supply flow inlet, a supply flow outlet, at least two pressure ports, and a continuous fluid passage between said supply flow inlet and said supply flow outlet;
  b. a throttle blade movably positioned within said continuous fluid passage, whereby an effective area of a throttle flow opening is defined between said throttle blade and said continuous fluid passage;
  c. a fast-acting rotary actuator mounted to said unitary block assembly, said rotary actuator having a rotary drive shaft integrally connected to said throttle blade, said rotary actuator being operatively connected to actuate said rotary drive shaft and to directly control a position of said throttle blade in relation to said continuous flow passage and, consequently, to control a size of the effective area of said throttle flow opening; and
  d. control circuitry associated with at least one printed circuit board (PCB), said control circuitry comprising a microcontroller, a plurality of pressure sensors, a thermistor; wherein:
  e. a first pressure port of said two pressure ports is open to direct fluid communication with said continuous fluid passage in a location that is upstream of said throttle blade;
  f. a second pressure port of said two pressure ports is open to direct fluid communication with said continuous fluid passage in a location that is downstream of said throttle blade;
  g. a first pressure sensor of said plurality of pressure sensors is associated with the first of said two pressure ports for sensing the pressure therein;
  h. a second pressure sensor of said plurality of pressure sensors is associated with the second of said two pressure ports for sensing the pressure therein;
  i. a third pressure sensor of said plurality of pressure sensors is oriented to sense a difference in pressure between two locations in said continuous fluid passage, the first location being upstream of said throttle blade and the second location being downstream of said throttle blade;
  j. said thermistor being positioned to sense the temperature of the gaseous supply flow in said continuous fluid passage; and
  k. said microcontroller configured to receive, from an engine control module, a signal representing the instantaneously desired mass flowrate for the gaseous supply flow, said microcontroller having connections for direct or indirect communication with said rotary actuator for sending signals to said rotary actuator to control the operation of said rotary actuator, said microcontroller configured to interdependently coordinate operation of said throttle by varying actuation of said rotary actuator to thereby produce a highly accurate mass flowrate of the gaseous supply flow that corresponds to the instantaneously desired mass flowrate for the gaseous supply flow, the varying actuation based on pressure readings from the third pressure sensor when a pressure differential across the throttle blade is within a predefined range and based on pressure readings from the first and the second pressure sensors when the pressure differential across the throttle blade is outside of the predefined range.

2. The throttle of claim 1, wherein said control circuitry further comprises a position sensor, said position sensor being oriented to directly or indirectly sense the position of said throttle blade for enabling accurate control of the position of said throttle blade and thereby enable highly accurate gaseous supply flow control.

3. The throttle of claim 1, wherein:
said unitary block assembly further defines a plurality of spaces within which at least portions of said rotary drive shaft are operatively rotatable;
said rotary drive shaft is non-articulated and has a position detectable portion that is positioned at least partially within at least a first of said plurality of spaces; and
said control circuitry further comprises a position sensor assembly positioned in said first of said plurality of spaces; and further comprising:
first, second and third bearing assemblies for supporting said rotary drive shaft at a respective first, second and third locations along its length, said first location and said second location being located on opposite sides of said continuous fluid passage, a motor of said rotary actuator being positioned between said second and third locations;
said position detectable portion of said rotary drive shaft extending from said motor in a direction away from said continuous fluid passage, said position detectable portion extending into said first of said plurality of spaces; and
said position sensor assembly of said control circuitry being mounted on a portion of said PCB, said portion of said PCB being oriented in proximity to said position detectable portion of said rotary drive shaft, for accurately detecting the position of said rotary drive shaft, thereby indirectly sensing the position of said throttle blade.

4. The throttle of claim 1, wherein said unitary block assembly contains said rotary actuator and said PCB, said rotary drive shaft is non-articulated, and said unitary block assembly further comprising a plurality of bearing assemblies for supporting said rotary drive shaft at a respective plurality of locations along its length, a first and second of said plurality of bearing assemblies being located on opposite sides of said continuous fluid passage.

5. The throttle of claim 1 wherein the throttle is for a large engine fueled by a gaseous fuel supply, and wherein:
   said throttle is operatively connectable to control the gaseous fuel supply flow of said engine, thereby enabling highly accurate mass flow control of the gaseous fuel supply;
   said unitary block assembly defines a plurality of spaces within which said rotary drive shaft is operatively rotatable;
   said rotary actuator comprises a brushless motor located and mounted to said unitary block assembly within at least one of said plurality of spaces;
   said PCB is located and mounted to said unitary block assembly within at least one of said plurality of spaces, and electronic components of said PCB are coated with a coating that is protective of such electronic components against the otherwise corrosive characteristics of the gaseous fuel supply that said throttle operatively controls;
   said rotary drive shaft comprises an armature extending radially therefrom; and
   said position sensor senses a position of said armature within a range of possible positions for said armature, thereby enabling sensing of a position that directly correlates to the position of said throttle blade relative to said continuous fluid passage.

6. The throttle of claim 1, wherein said throttle provides highly accurate mass flow control of an air supply, with or without fuel mixed therein.

7. The throttle of claim 1, wherein:
   a. said unitary block assembly defines a plurality of spaces;
   b. at least a portion of said rotary drive shaft is operatively rotatable within at least one space of said plurality of spaces;
   c. said rotary actuator comprises a stepper motor located and mounted to said unitary block assembly within at least one space of said plurality of spaces; and
   d. said control circuitry further comprises a position sensor assembly mounted on a portion of said PCB, said position sensor assembly being adapted for accurately detecting a position of said rotary drive shaft, said position sensor assembly comprising a plurality of Hall effect sensors.

8. The throttle of claim 7, wherein said rotary drive shaft is non-articulated, and said unitary block assembly further comprises a plurality of bearing assemblies for supporting said rotary drive shaft at a plurality of locations along its length.

9. The throttle of claim 1, wherein the supply flow through said throttle comprises a non-choked flow.

10. The throttle of claim 1, wherein the instantaneously desired mass flowrate for the gaseous supply flow is determined, at least in part based on time-averaged pressures sensed by said plurality of pressure sensors, said time-averaged pressures being averaged over a period of time corresponding to a single cylinder combustion cycle of the spark-ignited internal combustion engine for which said supply flows are being controlled.

11. A supply flow control system for a large spark-ignited internal combustion engine, comprising:
   a first throttle configured to control a mass flowrate of a gaseous fuel supply flow to the internal combustion engine, even if the flow of the gaseous fuel is non-choked, and thereby enabling highly accurate mass flow control of the gaseous fuel supply, the first throttle comprising:
   a. a unitary block assembly defining a supply flow inlet, a supply flow outlet, at least two pressure ports, and a continuous fluid passage between said supply flow inlet and said supply flow outlet;
   b. a throttle blade movably positioned within said continuous fluid passage, whereby an effective area of a throttle flow opening is defined between said throttle blade and said continuous fluid passage;
   c. a fast-acting rotary actuator mounted to said unitary block assembly, said rotary actuator having a rotary drive shaft integrally connected to said throttle blade, said rotary actuator being operatively connected to actuate said rotary drive shaft and to directly control a position of said throttle blade in relation to said continuous flow passage and, consequently, to control a size of the effective area of said throttle flow opening; and
   d. control circuitry associated with at least one printed circuit board (PCB), said control circuitry comprising a microcontroller, a plurality of pressure sensors, a thermistor; wherein:
   e. a first pressure port of said two pressure ports is open to direct fluid communication with said continuous fluid passage in a location that is upstream of said throttle blade;
   f. a second pressure port of said two pressure ports is open to direct fluid communication with said continuous fluid passage in a location that is downstream of said throttle blade;
   g. a first pressure sensor of said plurality of pressure sensors is associated with the first of said two pressure ports for sensing the pressure therein;
   h. a second pressure sensor of said plurality of pressure sensors is associated with the second of said two pressure ports for sensing the pressure therein;
   i. a third pressure sensor of said plurality of pressure sensors is oriented to sense a difference in pressure between two locations in said continuous fluid passage, the first location being upstream of said throttle blade and the second location being downstream of said throttle blade;
   j. said thermistor being positioned to sense the temperature of the gaseous fuel supply flow in said continuous fluid passage;
   k. said microcontroller configured to receive, from an engine control module, a signal representing the instantaneously desired mass flowrate for the gaseous fuel supply flow, said microcontroller having connections for direct or indirect communication with said rotary actuator for sending signals to said rotary actuator to control the operation of said rotary actuator, said microcontroller configured to interdependently coordinate operation of said throttle by varying actuation of said rotary actuator to thereby produce a highly accurate mass flowrate of the gaseous fuel supply flow that corresponds to the instantaneously desired mass flowrate for the gaseous supply flow;
l. Said unitary block assembly defines a plurality of spaces within which said rotary drive shaft is operatively rotatable;
m. said rotary actuator comprises a brushless motor located and mounted to said unitary block assembly within at least one of said plurality of spaces;
n. said PCB is located and mounted to said unitary block assembly within at least one of said plurality of spaces, and electronic components of said PCB are coated with a coating that is protective of such electronic components against the otherwise corrosive characteristics of the gaseous fuel supply that said throttle operatively controls;
o. said rotary drive shaft comprises an armature extending radially therefrom; and
p. said position sensor senses a position of said armature within a range of possible positions for said armature, thereby enabling sensing of a position that directly correlates to the position of said throttle blade relative to said continuous fluid passage.

12. The supply flow control system of claim 11, further comprising:
a second throttle configured to highly accurately control of a mass flowrate of an air supply to the internal combustion system, even if the flow of said air supply is non-choked, the second throttle comprising:
a. a unitary block assembly defining a supply flow inlet, a supply flow outlet, at least two pressure ports, and a continuous fluid passage between said supply flow inlet and said supply flow outlet;
b. a throttle blade movably positioned within said continuous fluid passage, whereby an effective area of a throttle flow opening is defined between said throttle blade and said continuous fluid passage;
c. a fast-acting rotary actuator mounted to said unitary block assembly, said rotary actuator having a rotary drive shaft integrally connected to said throttle blade, said rotary actuator being operatively connected to actuate said rotary drive shaft and to directly control a position of said throttle blade in relation to said continuous flow passage and, consequently, to control a size of the effective area of said throttle flow opening; and
d. control circuitry associated with at least one printed circuit board (PCB), said control circuitry comprising a microcontroller, a plurality of pressure sensors, a thermistor; wherein:
e. a first pressure port of said two pressure ports is open to direct fluid communication with said continuous fluid passage in a location that is upstream of said throttle blade;
f. a second pressure port of said two pressure ports is open to direct fluid communication with said continuous fluid passage in a location that is downstream of said throttle blade;
g. a first pressure sensor of said plurality of pressure sensors is associated with the first of said two pressure ports for sensing the pressure therein;
h. a second pressure sensor of said plurality of pressure sensors is associated with the second of said two pressure ports for sensing the pressure therein;
i. a third pressure sensor of said plurality of pressure sensors is oriented to sense a difference in pressure between two locations in said continuous fluid passage, the first location being upstream of said throttle blade and the second location being downstream of said throttle blade;
j. said thermistor being positioned to sense the temperature of the air supply flow in said continuous fluid passage; and
k. said microcontroller configured to receive, from an engine control module, a signal representing the instantaneously desired mass flowrate for the air supply flow, said microcontroller having connections for direct or indirect communication with said rotary actuator for sending signals to said rotary actuator to control the operation of said rotary actuator, said microcontroller configured to interdependently coordinate operation of said throttle by varying actuation of said rotary actuator to thereby produce a highly accurate mass flowrate of the air supply flow that corresponds to the instantaneously desired mass flowrate for the air supply flow.

* * * * *